(12) United States Patent
Parkvall et al.

(10) Patent No.: US 9,125,135 B2
(45) Date of Patent: Sep. 1, 2015

(54) INDEPENDENT CONFIGURATION IDENTITIES IN A HETEROGENEOUS CELLULAR COMMUNICATION NETWORK

(75) Inventors: Stefan Parkvall, Stockholm (SE); George Jöngren, Stockholm (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 401 days.

(21) Appl. No.: 13/449,604

(22) Filed: Apr. 18, 2012

(65) Prior Publication Data

US 2012/0309405 A1 Dec. 6, 2012

Related U.S. Application Data

(60) Provisional application No. 61/483,972, filed on May 9, 2011.

(51) Int. Cl.
*H04W 72/00* (2009.01)
*H04W 48/08* (2009.01)
*H04W 84/04* (2009.01)

(52) U.S. Cl.
CPC ............ *H04W 48/08* (2013.01); *H04W 84/045* (2013.01)

(58) Field of Classification Search
CPC ..... H04W 16/00; H04W 16/04; H04W 16/10; H04W 28/02; H04W 28/18; H04W 72/00; H04W 72/06
See application file for complete search history.

(56) References Cited

U.S. PATENT DOCUMENTS

| | | | |
|---|---|---|---|
| 7,633,926 B1 * | 12/2009 | Sethi et al. | 370/349 |
| 7,822,420 B1 * | 10/2010 | Schulz | 455/447 |
| 7,911,936 B2 * | 3/2011 | Mohanty et al. | 370/208 |
| 2004/0057438 A1 * | 3/2004 | Berger et al. | 370/395.64 |
| 2005/0008019 A1 * | 1/2005 | Berger et al. | 370/395.1 |
| 2009/0034526 A1 * | 2/2009 | Ahmadi et al. | 370/392 |
| 2009/0285134 A1 * | 11/2009 | Struhsaker et al. | 370/280 |
| 2010/0142467 A1 | 6/2010 | Tiirola et al. | |
| 2010/0311452 A1 * | 12/2010 | Li et al. | 455/509 |
| 2011/0002265 A1 * | 1/2011 | Chen et al. | 370/328 |
| 2011/0223937 A1 * | 9/2011 | Leppanen et al. | 455/456.2 |
| 2011/0317574 A1 * | 12/2011 | Richardson | 370/252 |
| 2012/0134284 A1 | 5/2012 | Dahlman et al. | |
| 2012/0172083 A1 * | 7/2012 | Logalbo et al. | 455/525 |
| 2013/0258938 A1 * | 10/2013 | Sagfors et al. | 370/312 |

OTHER PUBLICATIONS

International Search Report for PCT/IB2012/052177 mailed Jul. 10, 2012, 14 pages.
Siemens, "Mechanism for default and pre-defined configurations in UTRAN," 3GPP TSG-RAN2#45bis, R2-050097, Jan. 10-14, 2004, 5 pages.
Dahlman, E et al, "4G LTE/LTE-advanced for mobile broadband," Academic Press, Boston, 2011, pp. 95-107, 152-157, 301-305.

* cited by examiner

*Primary Examiner* — Nathan Mitchell
*Assistant Examiner* — Shantell L Heiber
(74) *Attorney, Agent, or Firm* — Withrow & Teranova, PLLC

(57) ABSTRACT

Systems and methods are disclosed for using multiple configuration groups having corresponding configuration identity (CID) parameters to configure a transmission channel and a reception channel for a user equipment device in a cellular communication network. In one embodiment, a user equipment device in a cellular communication network obtains CID values for CID parameters for a number of configuration groups. Each of the configuration groups includes one or more transmission channel or reception channel parameters. For each of the configuration groups, the user equipment device configures the parameters in the configuration group based on the CID value obtained for the CID parameter for the configuration group. In this manner, the transmission channel and the reception channel for the user equipment device are configured based on multiple CID values rather than a single physical layer cell identifier for a cell in which the user equipment device is located.

21 Claims, 17 Drawing Sheets

INDEPENDENT CONFIGURATION IDENTITIES IN A HETEROGENEOUS CELLULAR COMMUNICATION NETWORK

RELATED APPLICATIONS

This application claims the benefit of provisional patent application Ser. No. 61/483,972, filed May 9, 2011, the disclosure of which is hereby incorporated herein by reference in its entirety.

FIELD OF THE DISCLOSURE

The present disclosure relates to a heterogeneous cellular communication network.

BACKGROUND

The Long Term Evolution (LTE) standard defines multiple channel types to organize transmissions between a base station and a mobile terminal. Logical channels are characterized by the type of information transmitted, and transport channels are characterized by how the information is transmitted.

The set of logical-channel types specified for LTE includes:

Broadcast Control Channel (BCCH): BCCH is used for transmission of system information from the network to all mobile terminals in a cell. This is information that is repeatedly broadcast by the network and which needs to be acquired by mobile terminals in order for the mobile terminals to be able to access and, in general, operate properly within the network and within a specific cell. The system information includes, among other things, information about downlink and uplink cell bandwidths, uplink/downlink configuration in case of Time Division Duplexing (TDD), detailed parameters related to random-access transmission and uplink power control, etc.

Paging Control Channel (PCCH): PCCH is used for paging of mobile terminals whose locations on a cell level are not known to the network.

Common Control Channel (CCCH): CCCH is used for transmission of control information in conjunction with random access.

Dedicated Control Channel (DCCH): DCCH is used for transmission of control information to/from a mobile terminal. This channel is used for individual configuration of mobile terminals such as different handover messages.

Multicast Control Channel (MCCH): MCCH is used for transmission of control information required for reception of the MTCH (for MTCH, see below).

Dedicated Traffic Channel (DTCH): DTCH is used for transmission of user data to/from a mobile terminal. This is the logical-channel type used for transmission of all uplink and non-Multimedia Broadcast over a Single Frequency Network (MBSFN) downlink user data.

Multicast Traffic Channel (MTCH): MTCH is used for downlink transmission of Multicast Broadcast Multimedia Services (MBMS) services.

The following transport-channel types are defined for LTE:

Broadcast Channel (BCH): BCH has a fixed transport format, provided by the LTE specifications. It is used for transmission of parts of the BCCH system information.

Paging Channel (PCH): PCH is used for transmission of paging information from the PCCH logical channel.

Downlink Shared Channel (DL-SCH): DL-SCH is the main transport channel used for transmission of downlink data in LTE. It supports key LTE features such as dynamic rate adaptation and channel-dependent scheduling in the time and frequency domains, hybrid Automatic Repeat Request (ARQ) with soft combining, and spatial multiplexing. DL-SCH is also used for transmission of the parts of the BCCH system information not mapped to the BCH. There can be multiple DL-SCHs in a cell, one per user equipment device (UE) scheduled in this Transmission Time Interval (TTI), and, in some subframes, one DL-SCH carrying system information.

Multicast Channel (MCH): MCH is used to support MBMS.

Uplink Shared Channel (UL-SCH): UL-SCH is the uplink counterpart to the DL-SCH, that is, the uplink transport channel used for transmission of uplink data.

Random Access Channel (RACH): RACH is used for random access.

Logical channels are multiplexed and mapped to transport channels as shown in FIG. 1 for the downlink and FIG. 2 for the uplink. The information on a transport channel is then further processed by the physical layer before transmission over the air interface to the receiver.

The physical layer is responsible for scrambling, coding, physical-layer hybrid-ARQ processing, modulation, multi-antenna processing, and mapping of the signal to the appropriate physical time-frequency resources. The physical layer also handles mapping of transport channels to physical channels.

A physical channel corresponds to the set of time-frequency resources used for transmission of a particular transport channel and each transport channel is mapped to a corresponding physical channel. In addition to the physical channels with a corresponding transport channel, there are also physical channels without a corresponding transport channel. These channels, known as L1/L2 control channels, are used for Downlink Control Information (DCI), providing the mobile terminal with the necessary information for proper reception and decoding of the downlink data transmission, and Uplink Control Information (UCI) used for providing the scheduler and the hybrid-ARQ protocol with information about the situation in the mobile terminal.

The physical-channel types defined in LTE include the following:

Physical Downlink Shared Channel (PDSCH): PDSCH is the main physical channel used for unicast transmission, but also for transmission of paging information.

Physical Broadcast Channel (PBCH): PBCH carries part of the system information required by the terminal in order to access the network.

Physical Multicast Channel (PMCH): PMCH is used for MBSFN operation.

Physical Downlink Control Channel (PDCCH): PDCCH is used for downlink control information, mainly scheduling decisions, required for reception of PDSCH and for scheduling grants enabling transmission on the PUSCH (for PUSCH, see below).

Physical Hybrid-ARQ Indicator Channel (PHICH): PHICH carries the hybrid-ARQ acknowledgement to indicate to the terminal whether a transport block should be retransmitted or not.

Physical Control Format Indicator Channel (PCFICH): PCFICH is a channel providing the terminals with information necessary to decode the set of PDCCHs. There is only one PCFICH per component carrier.

Physical Uplink Shared Channel (PUSCH): PUSCH is the uplink counterpart to the PDSCH. There is at most one PUSCH per uplink component carrier per terminal.

Physical Uplink Control Channel (PUCCH): PUCCH is used by the terminal to send hybrid-ARQ acknowledgements, indicating to the eNodeB whether the downlink transport block(s) was successfully received or not, to send channel-status reports aiding downlink channel-dependent scheduling, and for requesting resources to transmit uplink data upon. There is at most one PUCCH per terminal.

Physical Random Access Channel (PRACH): PRACH is used for random access.

The mapping between transport channels and physical channels is illustrated in FIG. 1 for the downlink and FIG. 2 for the uplink. Note that some of the physical channels, more specifically the channels used for downlink control information (PCFICH, PDCCH, PHICH) and uplink control information (PUCCH), do not have a corresponding transport channel.

The different steps of the DL-SCH physical layer processing are outlined in FIG. 3. To randomize the interference between cells, LTE uses (cell-specific) scrambling of the coded transport channel data prior to mapping to the time-frequency resources. The purpose of scrambling (or, in general, randomization) is to make a signal to appear as random "noise" to a receiver not applying the correct descrambling sequence. Randomizing the transmitted data is beneficial as it allows spatial reuse of transmission resources. Although the resources are separated in the spatial domain, the isolation will often not be perfect (commonly referred to as the transmissions not being perfectly orthogonal). Thus, transmissions in one area may interfere with transmissions in another area. To avoid the receiver demodulating the wrong transmission, it is beneficial to ensure that any interference appears as random noise at the receiver. This is a well-known principle and has been used in several cellular systems supporting frequency reuse between cells, e.g., Wideband Code Division Multiple Access (WCDMA)/High Speed Packet Access (HSPA), LTE, and Code Division Multiple Access 2000 (CDMA2000). Sometimes the term quasi-orthogonal transmission is used to refer to the situation when multiple transmissions are not perfectly isolated (in time, frequency, code, or spatial domains) but randomization has been used to reduce the impact from one transmission to another.

The remaining downlink transport channels are based on the same general physical-layer processing as the DL-SCH, although with some restrictions in the set of features used. The UL-SCH in the uplink also follows similar physical-layer processing although there are some, for this disclosure irrelevant, differences such as the used of Discrete Fourier Transform (DFT) precoding for the UL-SCH.

Orthogonal Frequency Division Multiplexing (OFDM) is the basic transmission scheme for both the downlink and uplink transmission directions in LTE although, for the uplink, specific means are taken to ensure efficient power-amplifier operation. In the time domain, LTE transmission is organized into (radio) frames of length 10 milliseconds (ms), each of which is divided into ten equally sized subframes of length 1 ms as illustrated in FIG. 4. Each subframe consists of two equally sized slots of length $T_{slot}=0.5$ ms with each slot consisting of a number of OFDM symbols including cyclic prefix.

A resource element, consisting of one subcarrier during one OFDM symbol, is the smallest physical resource in LTE. Furthermore, as illustrated in FIG. 5, subcarriers are grouped into resource blocks, where each resource block consists of 12 consecutive subcarriers in the frequency domain and one 0.5 ms slot in the time domain. Each resource block thus consists of 7×12=84 resource elements in case of normal cyclic prefix and 6×12=72 resource elements in case of extended cyclic prefix. Although resource blocks are defined over one slot, the basic time domain unit for dynamic scheduling in LTE is one subframe, consisting of two consecutive slots. The minimum scheduling unit consisting of two time-consecutive resource blocks within one subframe (one resource block per slot) can be referred to as a resource block pair. The resource block definition above applies to both the downlink and uplink transmission directions.

Downlink reference signals are predefined signals occupying specific resource elements within the downlink time-frequency grid. The LTE specification includes several types of downlink reference signals which are transmitted in different ways and used for different purposes by the receiving terminal.

Cell-Specific Reference Signals (CRSs) are transmitted in every downlink subframe and in every resource block in the frequency domain, thus covering the entire cell bandwidth. The CRSs can be used by the terminal for channel estimation for coherent demodulation.

Demodulation Reference Signals (DM-RSs), also sometimes referred to as UE-specific reference signals, are specifically intended to be used by terminals for channel estimation for PDSCH when the CRSs cannot be used. The label "UE-specific" relates to the fact that each demodulation reference signal is intended for channel estimation by a single terminal. That specific reference signal is then only transmitted within the resource blocks assigned for PDSCH transmission to that terminal.

CSI Reference Signals (CSI-RSs) are specifically intended to be used by terminals to acquire Channel-State Information (CSI) in case when DM-RSs are used for channel estimation. CSI-RSs have a significantly lower time/frequency density, and thus implies less overhead, compared to the CRSs. A terminal can be provided with information about multiple CSI-RSs, one to measure upon and one or several that the terminal shall treat as "unused" resource elements (CSI-RS muting).

MBSFN reference signals are intended to be used for channel estimation for coherent demodulation in case of MCH transmission using MBSFN.

Positioning Reference Signals (PRSs) were introduced in LTE release 9 to enhance LTE positioning functionality, and more specifically to support the use of terminal measurements on multiple LTE cells to estimate the geographical position of the terminal. The positioning reference symbols of a certain cell can be configured to correspond to empty resource elements in neighboring cells, thus enabling high-Signal-to-Interference (SIR) conditions when receiving neighboring cell positioning reference signals.

There are two types of reference signals defined for the LTE uplink:

Uplink DM-RSs are intended to be used by the base station for channel estimation for coherent demodulation of the uplink physical channels (PUSCH and PUCCH). DM-RSs are thus only transmitted together with PUSCH or PUCCH and are then transmitted with the same bandwidth as the corresponding physical channel.

Uplink Sounding Reference Signals (SRSs) are intended to be used by the base station for channel-state estimation to support uplink channel-dependent scheduling and link adaptation. The SRSs can also be used in cases when uplink transmission is needed although there is no data to transmit. Sounding reference signals can either be transmitted periodically as configured by higher layers or as "one shot" upon request from the network.

Reference signals of different types, both in uplink and downlink, are typically separated in the time and/or frequency domain. For example, the downlink CRSs and DM-RSs from the same cell occupy different resource elements. These reference signals are therefore said to be orthogonal as no interference will occur between the two. However, between reference signals of the same type but belonging to different cells or different terminals, orthogonality can in general not be provided as this would result in excessive resource consumption. Therefore, the reference signal sequences and the processing in general is such that two reference signals use the same time-frequency resources but with different (pseudo-random) sequences to reduce impact from one reference signal to another. In essence, this idea of quasi-orthogonality is the same as scrambling for the data transmission.

Cell search is the process in LTE where the terminal acquires frequency and time synchronization to a cell and acquires the physical-layer cell identity (ID) of the cell (there are in total 3×168=504 possible identities). To assist the cell search, two special signals are transmitted on each downlink component carrier, the Primary Synchronization Signal (PSS) and the Secondary Synchronization Signal (SSS). Although having the same detailed structure, the time-domain positions of the synchronization signals within the frame differ somewhat depending on if the cell is operating in Frequency Division Duplexing (FDD) or TDD mode. Time and frequency synchronization is required at the receiver (i.e., the UE) in order to properly receive and process any information transmitted by the transmitter (i.e., the base station).

The physical-layer cell identity of the cell in which the terminal has located is obtained by the terminal and is used for multiple purposes in LTE including:
  for uplink transmissions:
    to determine the scrambling sequence used for the PUSCH uplink channel and the pseudo-random sequence used for the PUCCH uplink channel;
    to determine the frequency hopping pattern for uplink transmission on PUSCH (if hopping is enabled);
    to determine the sequence and, if enabled, sequence hopping pattern for uplink DM-RS; and
    to determine the sequence and, if enabled, sequence hopping pattern for uplink SRS;
  for downlink transmissions:
    to determine the scrambling sequence for downlink unicast data transmission on PDSCH;
    to determine the scrambling sequence for downlink broadcast of system information (PBCH and Broadcast Channel (BCH) mapped to PDSCH) and paging (PCH mapped to PDSCH); and
    to determine the scrambling and time-frequency mapping of the PCFICH, PHICH, and PDCCH, used for transmission of downlink control information; and
  for downlink reference signals:
    to determine the sequence and the frequency location used for the CRSs;
    to determine the sequence and, in some cases (antenna port 5) the frequency-domain location used for the UE-specific DM-RSs;
    to determine the sequence and the frequency location used for the PRSs; and
    to determine the sequence used for the CSI-RSs.

Thus, as can be seen from the extensive list above, the physical-layer identity of the cell to which the terminal is connected influences many functions as seen in FIG. 6. In particular,
  uplink transmission,
  downlink unicast reception, and
  downlink broadcast reception
all use functions with parameters derived from the same physical-layer cell ID.

The use of a so called heterogeneous deployment or heterogeneous cellular communication network is considered to be an interesting deployment strategy for cellular communication networks. As illustrated in FIG. 7, a heterogeneous deployment 10 includes a macro node 12 (i.e., a macro base station) and a pico node 14 (i.e., a pico base station) with different transmit powers and with overlapping coverage areas. Notably, a heterogeneous cellular communication network typically includes numerous macro nodes 12 and numerous pico nodes 14. In such a deployment, the pico nodes 14 are typically assumed to offer high data rates (megabits per second (Mbit/s)), as well as provide high capacity (users per square meters (users/m$^2$) or Mbit/s/m$^2$), in the local areas where this is needed/desired, while the macro nodes 12 are assumed to provide full-area coverage. In practice, the macro nodes 12 may correspond to currently deployed macro cells while the pico nodes 14 are later deployed nodes, extending the capacity and/or achievable data rates within a macro cell 16 served by the macro node 12 where needed. In a typical case, there may be multiple pico nodes 14 within the macro cell 16.

The pico node 14 of the heterogeneous deployment 10 typically corresponds to a cell of its own, i.e., a pico cell 18, as illustrated in FIG. 8 where the indices "p" and "m" indicate common signals/channels for the pico and macro cells 16 and 18, respectively. This means that, in addition to downlink and uplink data transmission/reception, the pico node 14 also transmits the full set of common signals/channels associated with a cell. In the LTE context this includes:
  The PSSs and SSSs corresponding to the physical-layer cell ID of the pico cell 18,
  The CRSs, also corresponding to the physical-layer cell ID of the pico cell 18. The CRS can, for example, be used for downlink channel estimation to enable coherent demodulation of downlink transmissions.
  The BCH with corresponding pico cell system information for the pico cell 18.
As the pico node 14 transmits the common signals/channels, the corresponding pico cell 18 can be detected and selected (connected to) by a UE.

If the pico node 14 corresponds to a cell of its own, so-called L1/L2 control signaling on the PDCCH physical channel are also transmitted from the pico node 14 to connected UEs in addition to downlink data transmission on the PDSCH physical channel. For example, the L1/L2 control signaling provides downlink and uplink scheduling information and hybrid-ARQ related information to UEs within the cell.

In a heterogeneous deployment with a pico node corresponding to a cell of its own (FIG. 8), there is an inherent downlink/uplink imbalance due to the different transmit power of the macro and pico nodes/cells. This imbalance is illustrated in FIG. 9. The UE may connect to the cell (macro or pico) to which the path loss is the smallest. At least from an uplink data rate point-of-view, this is preferred as, for a given available UE transmit power, a smaller path loss leads to higher received power and thus to the possibility for higher data rates. However, due to the fact that common signals/channels as well as L1/L2 control channels are transmitted with higher power from the macro cell 16, compared to the pico cell 18, the UE connected to the pico cell 18 may experience very high interference from the transmission of these signals/channels in the macro cell 16. Although there are means to at least partly mitigate this interference, this requires special UE functionality not necessarily implemented in all UEs.

Alternatively, the UE may connect to the cell (macro or pico) from which the common channels (in practice the cell-specific reference signals) are received with the highest power. This is equivalent to say that the UE connects to the cell with the lowest path loss, weighted by the cell transmit power. However, due to the higher transmit power of the macro cell 16, a UE may then connect to the overlaid macro cell 16 even if the path loss to the pico cell 18 is smaller, leading to at least lower uplink data rates and potentially also a reduced downlink efficiency on a system level (although the downlink signals are received with stronger power from the macro cell 16, this is achieved at the expense of causing more downlink interference to other UEs).

SUMMARY

The present disclosure relates to using multiple configuration groups having corresponding Configuration Identity (CID) parameters to configure a transmission channel or reception channel for a user equipment device in a cellular communication network. The cellular communication network is, in one embodiment, a heterogeneous cellular network. In one embodiment, a user equipment device in a cellular communication network obtains CID values for CID parameters for a number of configuration groups. Each of the configuration groups includes one or more, but preferably multiple, transmission or reception channel parameters. The transmission or reception channel parameters may be, for example, uplink or downlink parameters. For each of the configuration groups, the user equipment device configures the parameters in the configuration group based on the CID value obtained for the CID parameter for the configuration group. In this manner, the transmission and/or reception channel for the user equipment device are configured based on multiple CID values rather than a single physical layer cell identifier for a cell in which the user equipment device is located.

In one embodiment, the cellular network is a heterogeneous cellular network, and an uplink and the downlink of the user equipment device are decoupled such that uplink transmissions from the user equipment device are received by one or more antenna points independently from which antenna point is used for downlink transmission to the user equipment device. In this embodiment, the one or more configuration groups include one or more downlink configuration groups and an uplink configuration group. Each of the one or more downlink configuration groups and the uplink configuration group has a number of parameters that are mapped to that configuration group. The user equipment device obtains CID values for the CID parameters of the downlink and uplink configuration groups. For each of the downlink and uplink configuration groups, the user equipment device configures the parameters mapped to the configuration group based on the CID value obtained for the CID parameter for the configuration group. By using the configuration groups rather than independently configuring each individual parameter, the decoupled uplink and downlink for the user equipment device are independently configured while maintaining a low signaling overhead for configuration messages.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

DETAILED DESCRIPTION

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Figure 1:
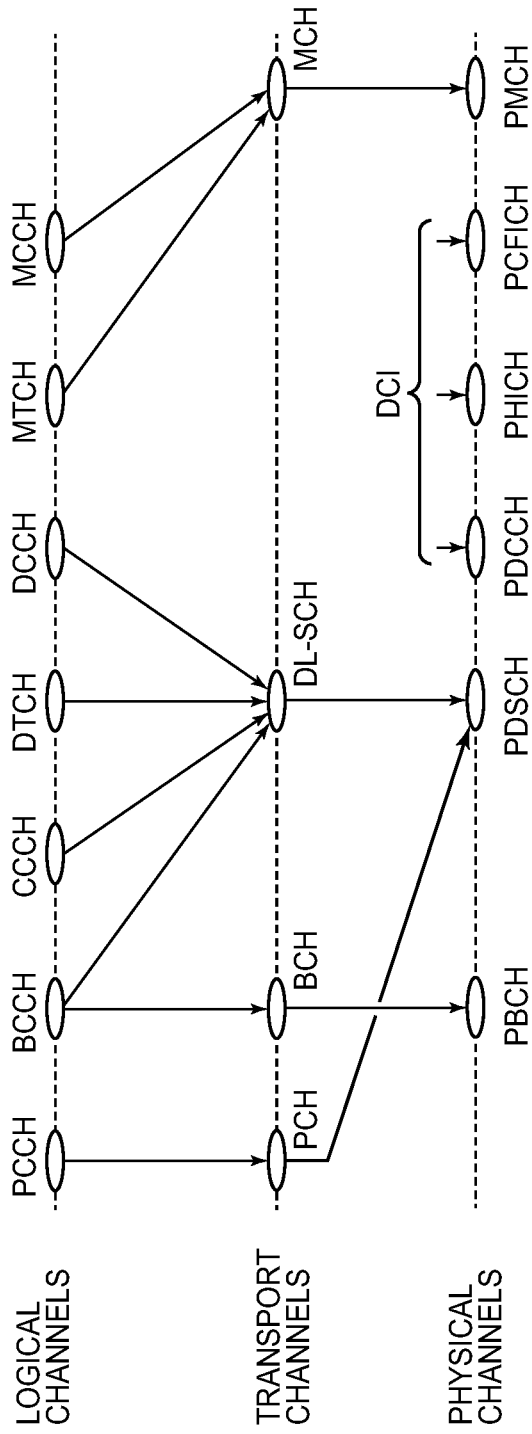
FIG. 1 illustrates mapping of local channels to transport channels for a downlink in Long Term Evolution (LTE) wireless communication networks.
Figure 2:
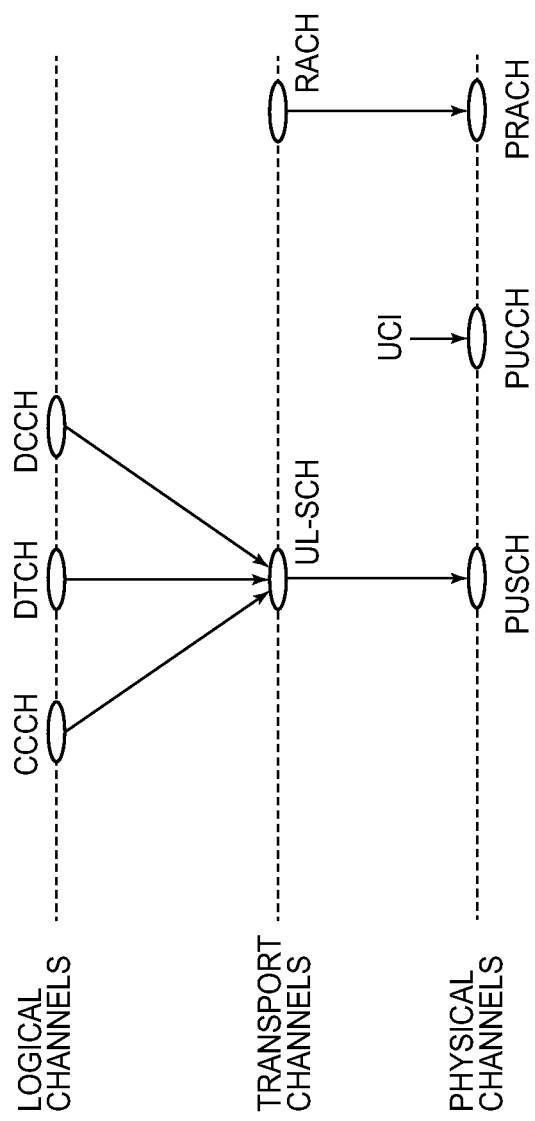
FIG. 2 illustrates mapping of local channels to transport channels for an uplink in LTE wireless communication networks.
Figure 3:
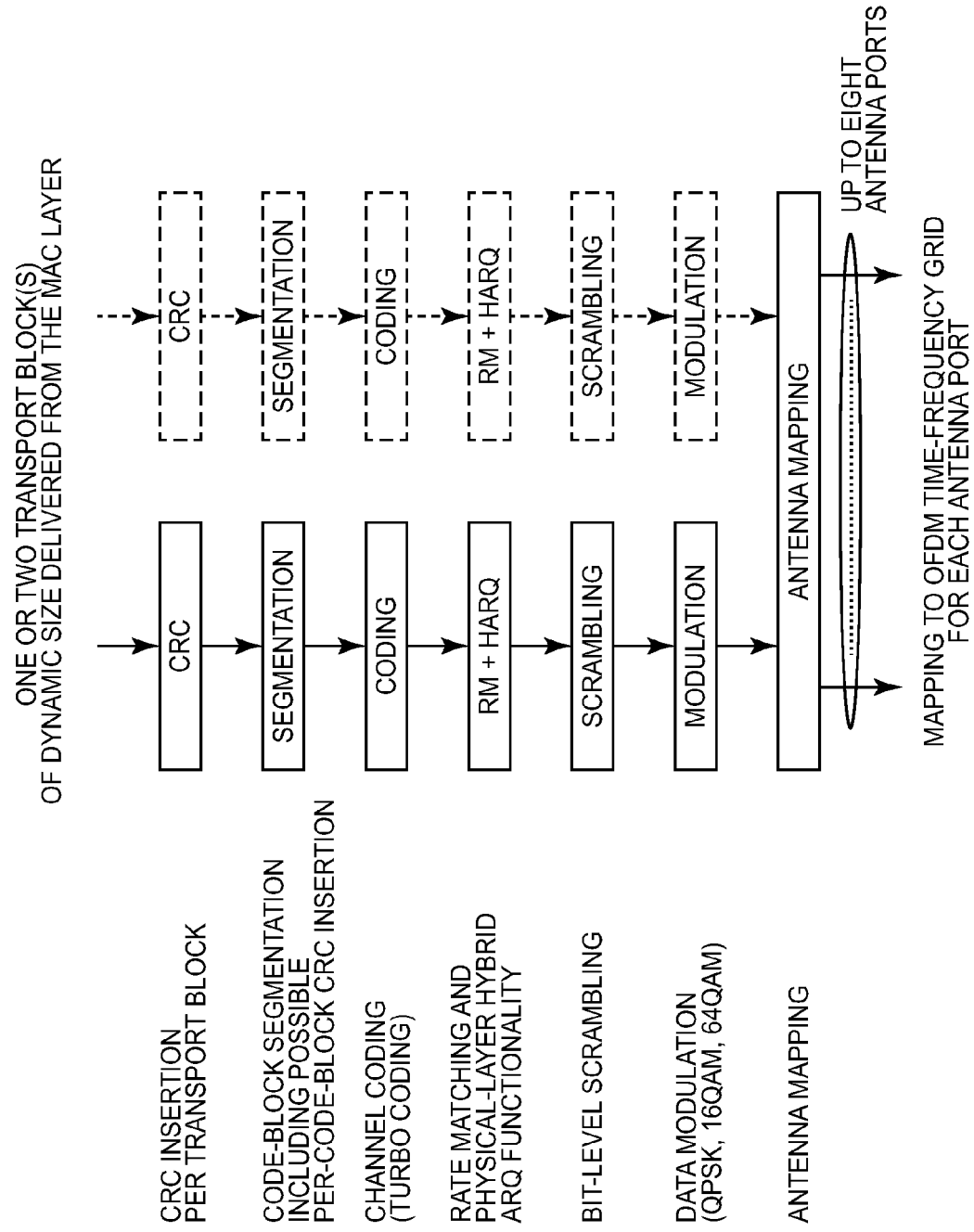
FIG. 3 illustrates steps of Downlink Shared Channel (DL-SCH) physical layer processing for LTE wireless communication networks.
Figure 4:
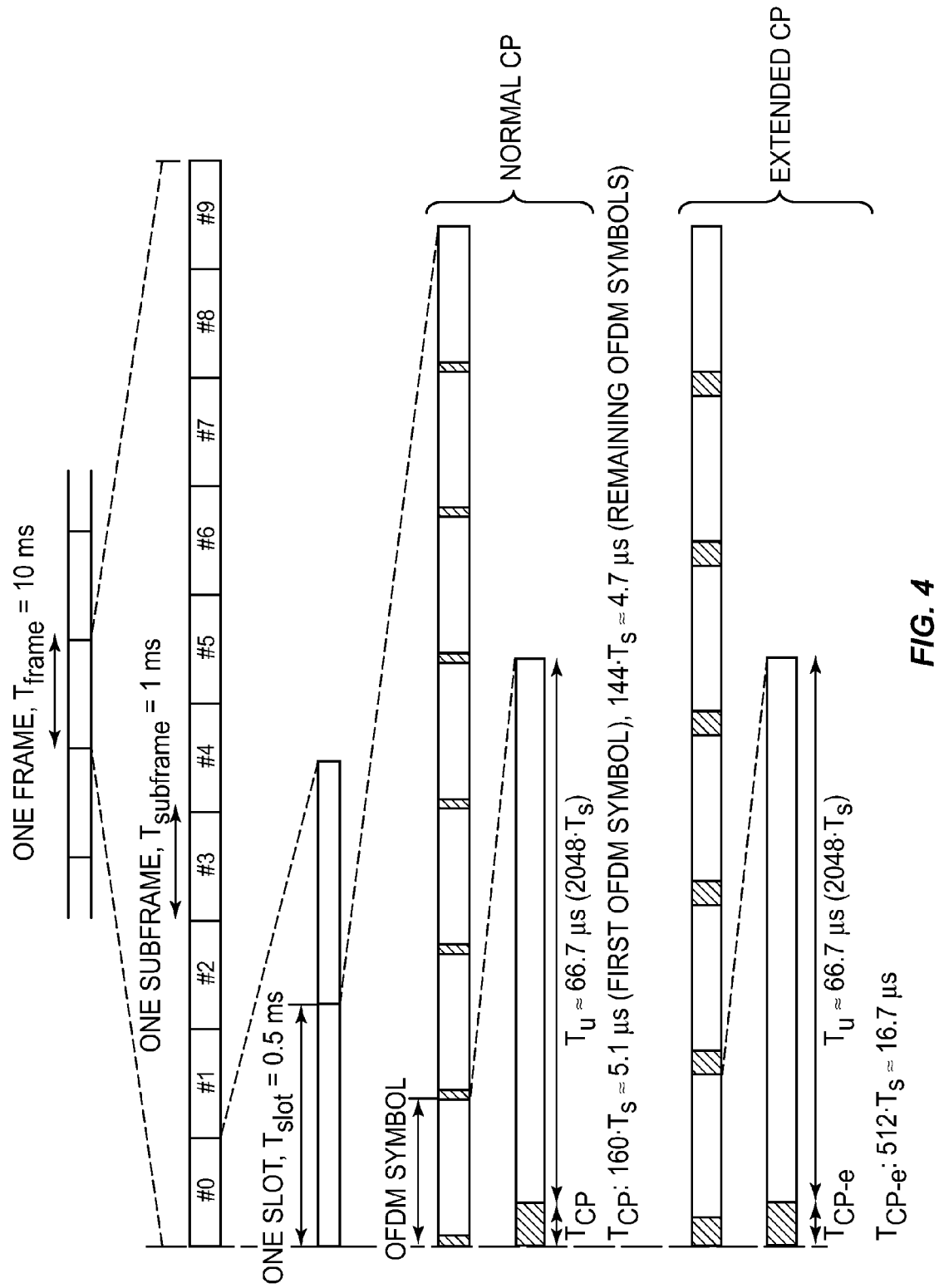
FIG. 4 illustrates the organization of LTE transmissions into frames and subframes.
Figure 5:
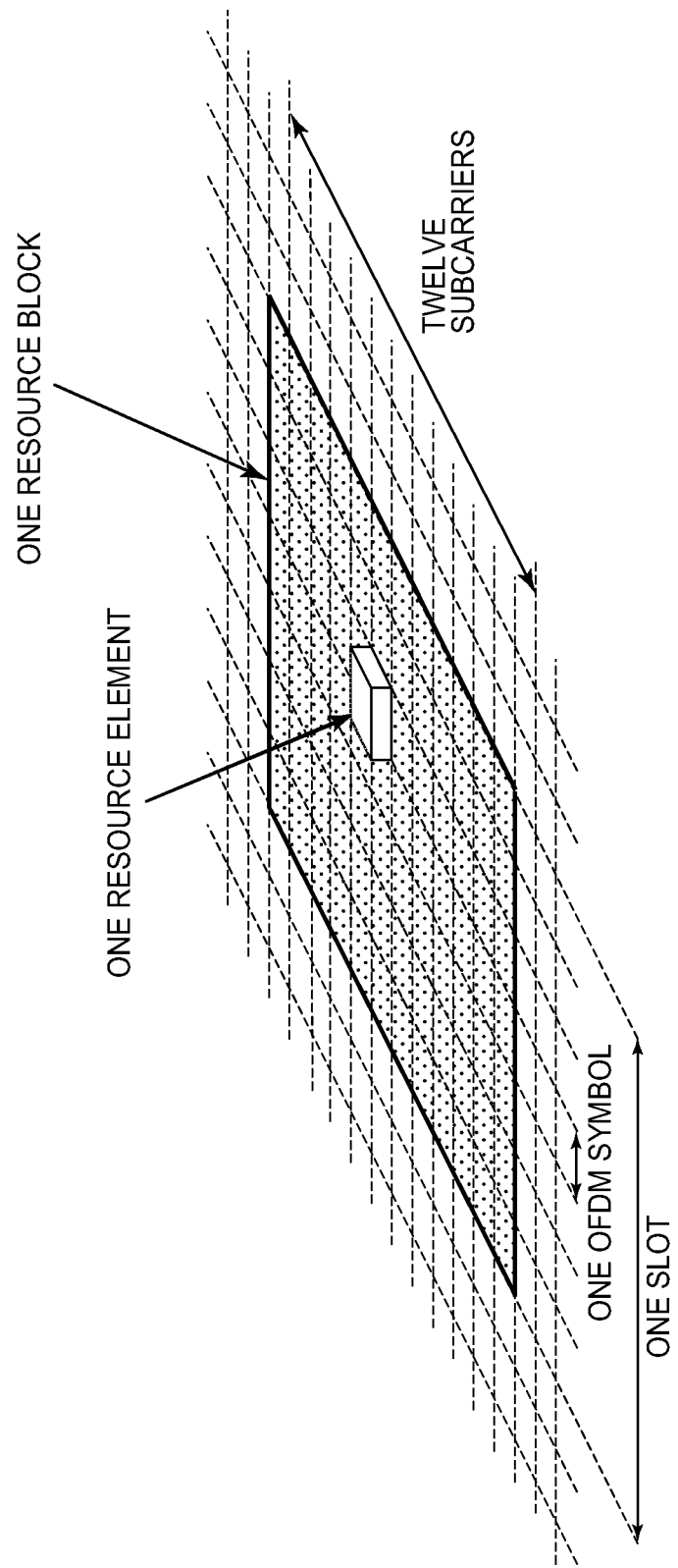
FIG. 5 illustrates an LTE resource block.
Figure 6:
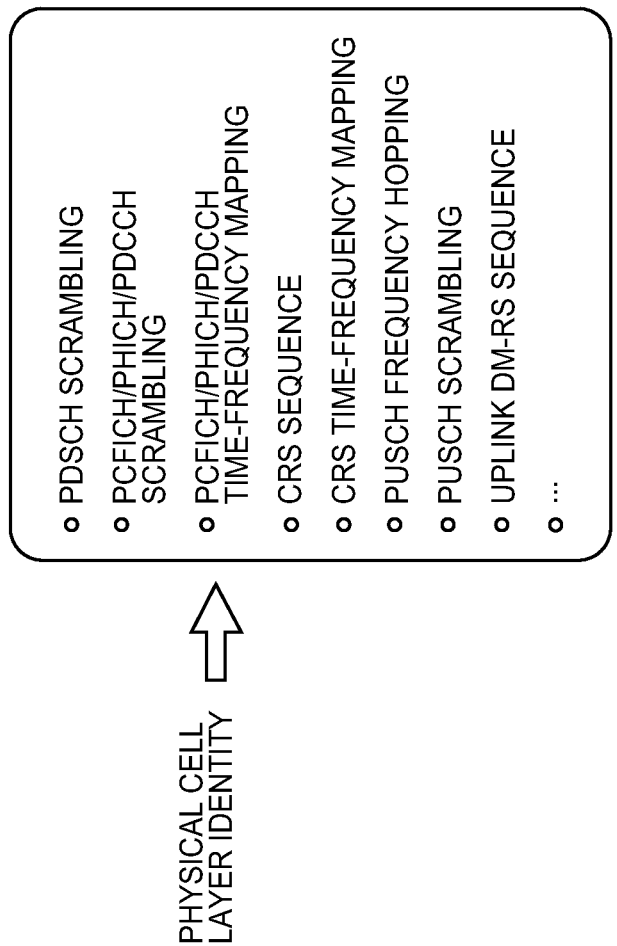
FIG. 6 illustrates parameters and functions traditionally configured in LTE based on a physical-layer identity of a cell to which a terminal is connected.
Figure 7:
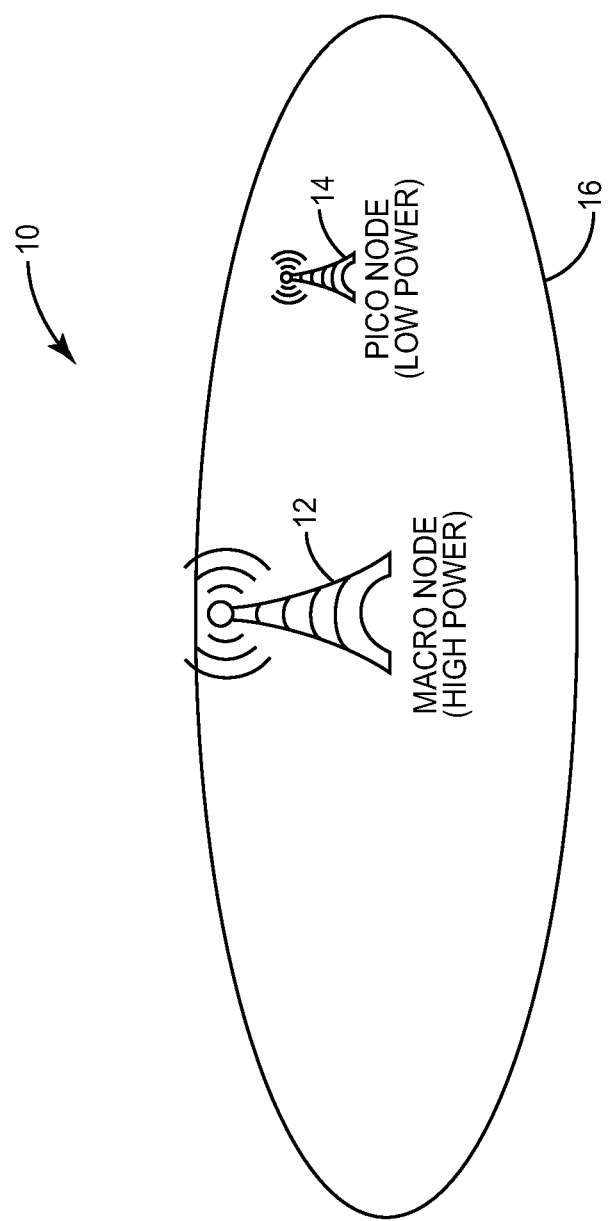
FIG. 7 illustrates a heterogeneous cellular communication network.
Figure 8:
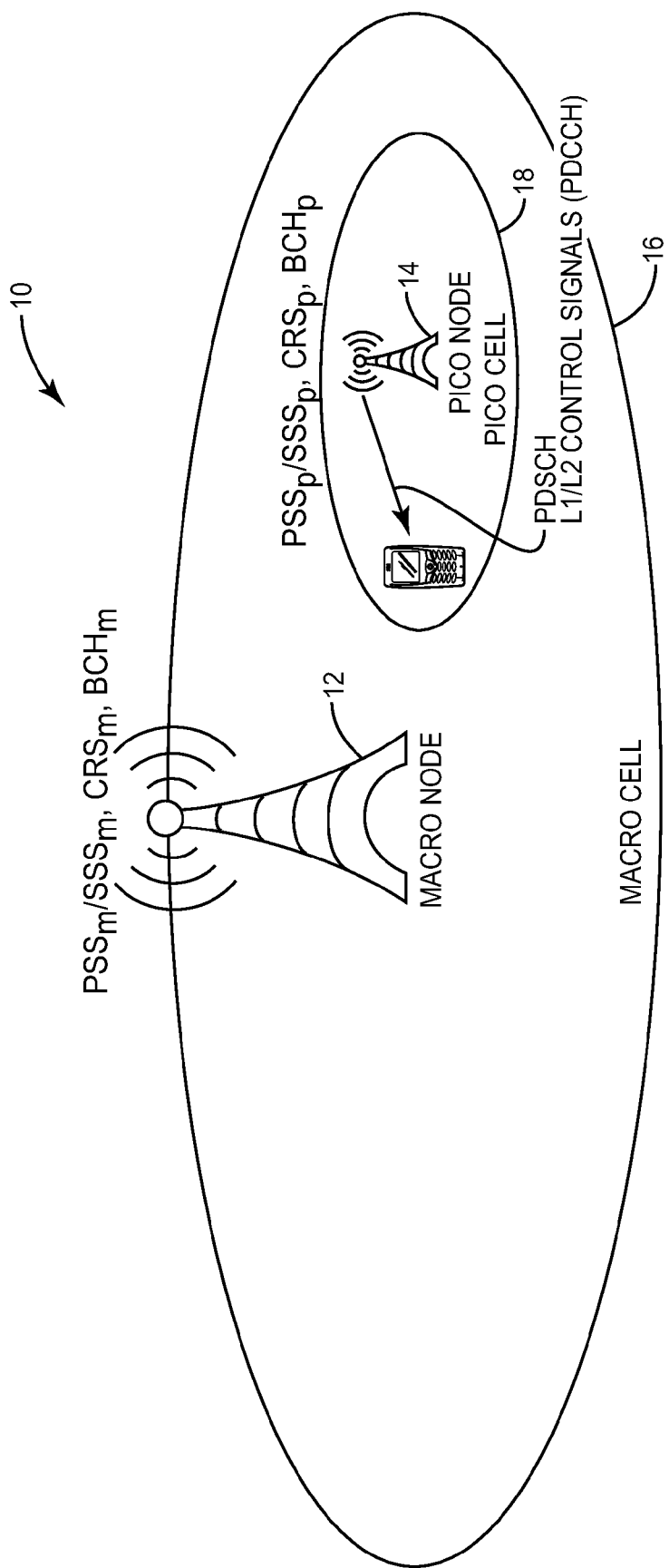
FIG. 8 illustrates a heterogeneous cellular communication network where the pico node has its own corresponding pico cell.
Figure 9:
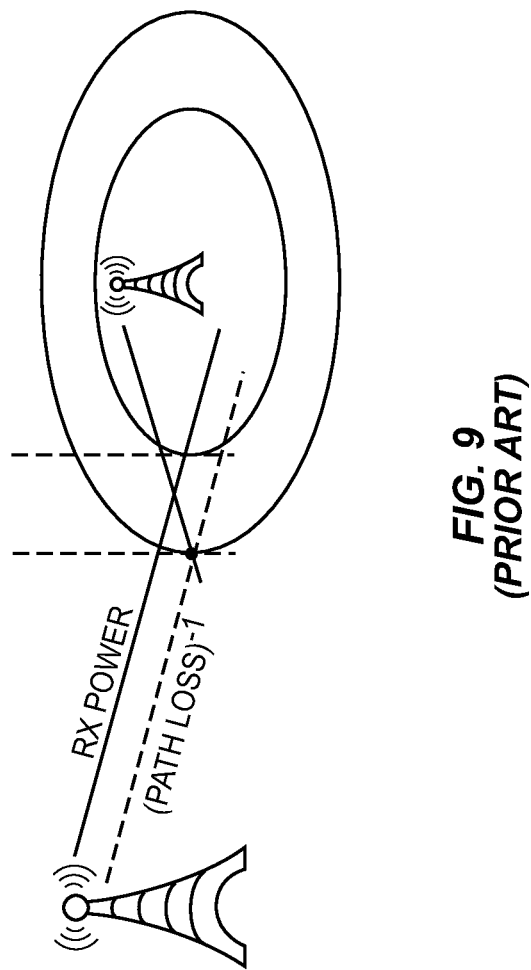
FIG. 9 illustrates a downlink/uplink imbalance in a heterogeneous cellular communication network.
Figure 10:
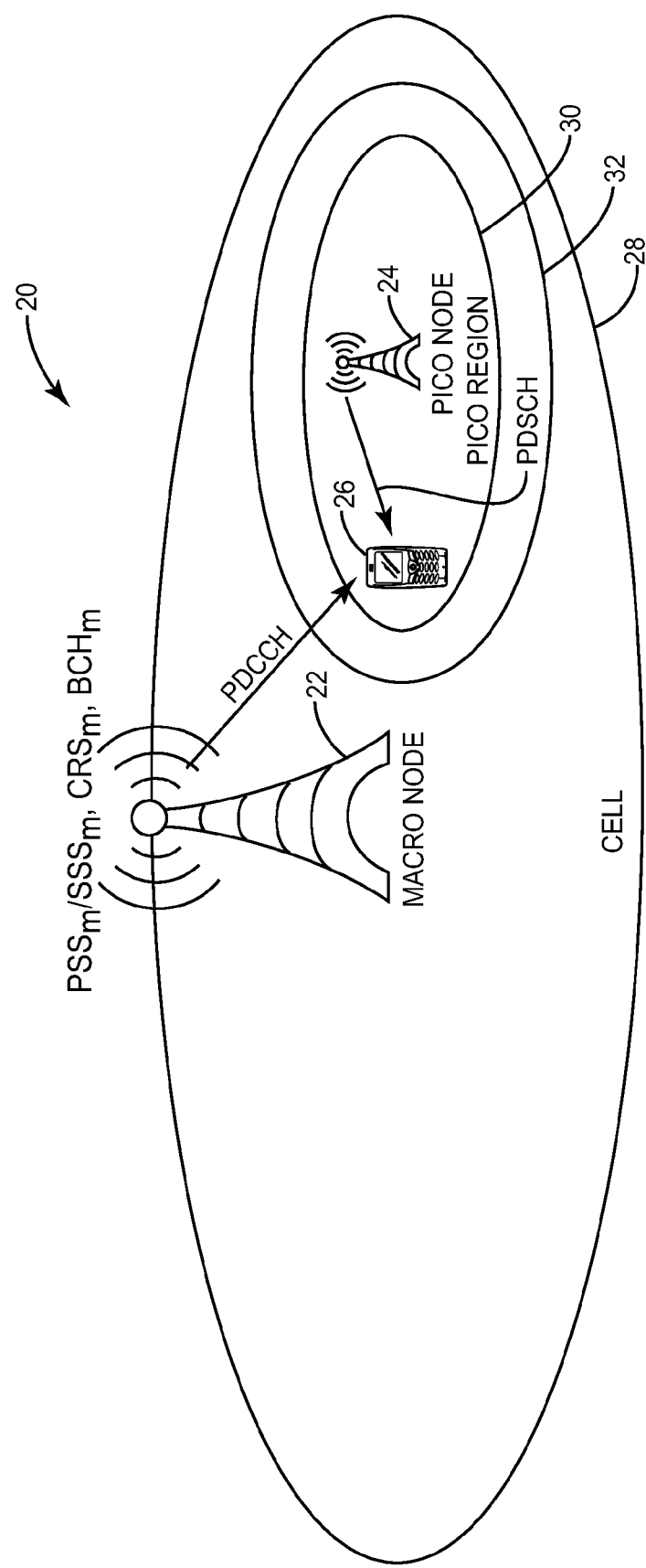
FIG. 10 illustrates a heterogeneous cellular communication network according to one embodiment of the present disclosure.

FIG. 10 illustrates a heterogeneous cellular communication network 20 in which user equipment devices (UEs), or mobile terminals, use multiple configuration groups to configure parameters for uplink and downlink according to one embodiment of the present disclosure. As illustrated, the heterogeneous cellular communication network 20 includes a macro node 22 and a pico node 24 that operate to serve a UE 26 located within a cell 28 served by the macro node 22. The pico node 24 serves a pico region 30 that, in this example, is within the cell 28. However, the pico region 30 may otherwise overlap the cell 28. The pico region 30 is not a pico cell. Rather, the pico region 30 is a region in which the pico node 24 provides a beam extension for the overlaid cell 28 (i.e., provides a data rate and capacity extension of the overlaid cell 28). Specifically, for Long Term Evolution (LTE), the pico node 24 transmits the Physical Downlink Shared Channel (PDSCH), but the macro node 22 transmits the Cell-Specific Reference Signal (CRS), Primary Synchronization Signal (PSS) and Secondary Synchronization Signal (SSS), as well as channels such as Physical Downlink Control Channel (PDCCH) and Physical Broadcast Channel (PBCH) relying on CRS for reception. To allow for demodulation and detection of the PDSCH despite the fact that no CRS is transmitted from the pico node 24, a Demodulation Reference Signal (DM-RS) is transmitted from the pico node 24 together with the PDSCH. The UE-specific reference signals can then be used by the UE 26 for PDSCH demodulation/detection. Note that while FIG. 10 illustrates only one macro node 22 and one pico node 24, the heterogeneous cellular communication network 20 may include numerous macro nodes 22 and numerous pico nodes 24. Further, multiple pico nodes 24 may be within the same cell 28. Also, while only one UE 26 is illustrated for clarity and ease of discussion, the cell 28 may serve numerous UEs 26.

In the heterogeneous cellular communication network 20, the problem of excessive common/control-channel interference to UEs located in the area served by the pico node 24 from the transmissions from the macro node 22 is not present as the common channels and L1/L2 control channels can be, in this case, transmitted from the macro node 22 even though PDSCH is transmitted from the pico node 24. Notably, this does not rely on any new functionality in the UEs but can allow existing UEs to exploit the full gains of the pico node 24.

In one embodiment, the pico node 24 is implemented as a Remote Radio Unit (RRU) connected to a central processing node also handling the macro node 22. With this deployment approach, uplink transmissions from the UE 26 can be received in any antenna point (i.e., any macro node 22 or pico node 24) or set of antenna points, independently from which antenna point was used for transmission to the UE 26. In essence, an uplink and downlink of the UE 26 have been decoupled. This provides several advantages. For example, downlink transmissions to the UE 26 can use the antenna point with the strongest received power, while uplink transmissions from the UE 26 can be received in the antenna point with the lowest path loss. Notably, the antenna point with the lowest path loss may not be the same as the antenna point from which the downlink is the strongest due to the difference in transmission power between antenna points. For instance, in FIG. 10, there is a boundary region 32 at the boundary of the cell 28 and the pico region 30 in which the uplink having the lowest path loss is the uplink to the pico node 24 while the strongest downlink is received from the macro node 22. The decoupled uplink and downlink deployment strategy can of course be generalized further such that a certain geographical area is covered by a plurality of antenna points, all connected to the same processing node. Algorithms in the centralized processing node can then, in a manner transparent to the UE 26, determine which antenna points to use for downlink transmission and uplink reception towards the UE 26.

In the heterogeneous cellular communication network 20 of FIG. 10, it is desirable to couple the transmission structure (e.g., scrambling, Reference Signal (RS) location, etc.) to the antenna point used for communications in a particular downlink/uplink direction. If the uplink of the UE 26 is received by a different antenna point than the antenna point(s) used for downlink transmission to the UE 26, it is beneficial to independently set the transmission structure for the two directions. This is not possible in the current version of LTE (Rel-10) as both the uplink and downlink transmission structures are derived from the same physical-layer cell identity (ID). Furthermore, a relatively costly handover procedure to another cell, requiring quite extensive Radio Resource Control (RRC) signaling and causing corresponding delays, is required if another transmission structure is desirable. One way to address these problems is to provide for individual configuration of each of the transmission parameters (e.g., scrambling sequences, reference signal structure, etc). However, such individual configuration of each of the transmission parameters would result in excessive overhead, which is especially unattractive if handovers between cells are frequent.

The present disclosure relates to using multiple configuration groups having corresponding Configuration Identity (CID) parameters to configure an uplink and a downlink for a UE in a heterogeneous cellular communication network, such as the heterogeneous cellular communication network 20 of FIG. 10. Using the UE 26 as an example, in general, the parameters for the uplink and the downlink for the UE 26 are divided into multiple configuration groups such that each configuration group includes one or more, and preferably multiple, uplink or downlink parameters. Each configuration group has a separate CID parameter. In one embodiment, the UE 26 obtains CID values for CID parameters for the configuration groups. For each of the configuration groups, the UE 26 configures the parameters in the configuration group based on the CID value obtained for the CID parameter for the configuration group. In this manner, the uplink and the downlink for the UE 26 are configured based on multiple CID values rather than a single physical layer cell ID for a cell in which the UE 26 is located. As such, transmission structures for the uplink and downlink are independently configurable. This is particularly beneficial for a heterogeneous cellular communication network such as that of FIG. 10 where the uplink and downlink for the UE 26 are decoupled.

It should be noted that while the discussion herein focuses primarily on configuration groups to configure uplink and/or downlink parameters for communication between UEs, such as the UE 26, and macro node 22 and the pico node 24 in the heterogeneous cellular communication network 20, the present disclosure is not limited thereto. The concepts described herein can be used to provide configuration groups to configure other types of transmission and/or reception link or channel parameters for a UE in a cellular communication network. For example, the concepts described herein may be used to provide configuration groups to configure transmission and/or reception link parameters between a UE and another UE for device-to-device communication.

Figure 11:
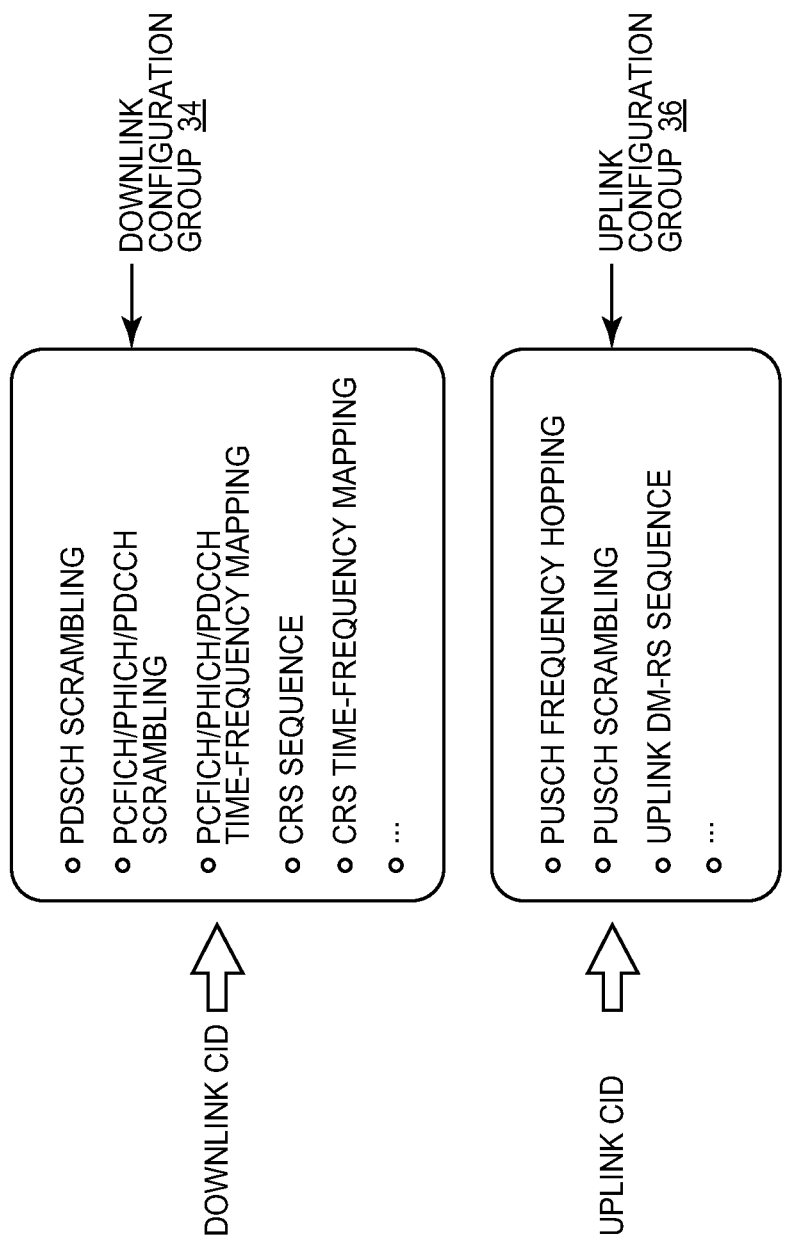
FIG. 11 illustrates two exemplary configuration groups for a user equipment device according to one embodiment of the present disclosure.

FIG. 11 illustrates two exemplary configuration groups for the UE 26 according to one embodiment of the present disclosure. In this exemplary embodiment, the configuration groups include a downlink configuration group 34 and an uplink configuration group 36. The downlink configuration group 34 has a corresponding downlink CID parameter and includes a number of downlink parameters. The downlink parameters mapped to the downlink configuration group 34 may be predefined (e.g., by a specification) or received by the UE 26 from the heterogeneous cellular communication network 20 (e.g., received from the macro node 22). For example, a mapping of the downlink parameters to the downlink configuration group 34 may be received via signaling such as, for instance, RRC signaling. Further, the signaling of the mapping of the downlink parameters to the downlink configuration group 34 may be UE specific signaling or broadcast signaling received by multiple UEs in the cell 28 including the UE 26.

In this example, the downlink parameters include a number of downlink scrambling parameters, namely, a PDSCH scrambling parameter and a Physical Control Format Indicator Channel (PCFICH)/Physical Hybrid Automatic Repeat Request (ARQ) Indicator Channel (PHICH)/PDCCH scrambling parameter; a time-frequency mapping parameter, namely, a PCFICH/PHICH/PDCCH time-frequency mapping parameter and a CRS time-frequency mapping parameter; and a cell-specific reference sequence, namely, a CRS sequence parameter. As will be appreciated by one of ordinary skill in the art, the downlink parameters may include additional downlink parameters.

As discussed below, the downlink parameters are configured by the UE 26 based on a CID value obtained for the downlink CID parameter using known relationships between the downlink CID parameter and the downlink parameters. In other words, values for the downlink parameters are derived from the CID value obtained for the downlink CID parameter. The CID value obtained for the downlink CID parameter may be received from the heterogeneous cellular communication network 20 (e.g., received from the macro node 22) via signaling or derived from a physical-layer cell ID for the cell 28. For example, the CID value for the downlink CID parameter may be signaled to the UE 26 via RRC signaling. Further, the signaling of the CID value for the downlink CID parameter to the UE 26 may be UE specific signaling or signaling broadcast to multiple UEs including the UE 26. As another example, the CID value for the downlink CID parameter may be set to the physical-layer cell ID of the cell 28 as a default and then overwritten via signaling from the heterogeneous cellular communication network 20 (e.g., from the macro node 22) as needed. The relationships between the downlink CID parameter and the downlink parameters in the downlink configuration group may be predefined (e.g., by a specification) or signaled to the UE 26 from the heterogeneous cellular communication network 20 (e.g., received via signaling from the macro node 22). Again, the signaling may be RRC signaling. Further, the signaling may be UE specific or broadcast signaling. The relationships may be represented as tables, formulas, or the like.

The uplink configuration group 36 has a corresponding uplink CID parameter and includes a number of uplink parameters. The uplink parameters mapped to the uplink configuration group 36 may be predefined (e.g., by a specification) or received by the UE 26 from the heterogeneous cellular communication network 20 (e.g., received from the macro node 22). For example, the mapping of the uplink parameters to the uplink configuration group 36 may be received via signaling such as, for instance, RRC signaling. Further, the signaling of the mapping of the uplink parameters to the uplink configuration group 36 may be UE specific signaling or broadcast signaling received by multiple UEs in the cell 28 including the UE 26.

In this example, the uplink parameters include an uplink frequency hopping parameter, namely, a Physical Uplink Shared Channel (PUSCH) frequency hopping parameter; an uplink scrambling parameter, namely, a PUSCH scrambling parameter; and a UE-specific reference sequence, namely, an uplink DM-RS sequence parameter. As will be appreciated by one of ordinary skill in the art, the uplink parameters may include additional uplink parameters.

As discussed below, the uplink parameters are configured by the UE 26 based on a CID value obtained for the uplink CID parameter using known relationships between the uplink CID parameter and the uplink parameters. In other words, values for the uplink parameters are derived from the CID value obtained for the uplink CID parameter. The CID value obtained for the uplink CID parameter may be received from the heterogeneous cellular communication network 20 (e.g., received from the macro node 22) via signaling or derived from a physical-layer cell ID for the cell 28. For example, the CID value for the uplink CID parameter may be signaled to the UE 26 via RRC signaling. Further, the signaling of the CID value for the uplink CID parameter to the UE 26 may be UE specific signaling or signaling broadcast to multiple UEs including the UE 26. As another example, the CID value for the uplink CID parameter may be set to the physical-layer cell ID of the cell 28 as a default and then overwritten via signaling from the heterogeneous cellular communication network 20 (e.g., from the macro node 22) as needed. The relationships between the uplink CID parameter and the uplink parameters in the uplink configuration group may be predefined (e.g., by a specification) or signaled to the UE 26 from the heterogeneous cellular communication network 20 (e.g., received via signaling from the macro node 22). Again, the signaling may be RRC signaling. Further, the signaling may be UE specific or broadcast signaling. The relationships may be represented as tables, formulas, or the like.

Using the heterogeneous cellular communication network 20 of FIG. 10 as an example, in one embodiment, if the UE 26 is located in the pico region 30 as illustrated, the CID value obtained for the downlink CID parameter and the CID value obtained for the uplink CID parameter are both CID values (or a single CID value) associated with the pico node 24. Conversely, if the UE 26 is located in the boundary region 32 at the boundary between the cell 28 and the pico region 30, the CID value obtained for the downlink CID parameter is a CID value associated with the macro node 22, and the CID value obtained for the uplink CID parameter is a CID value associated with the pico node 24. Still further, if the UE 26 is located in the cell 28 outside of the pico region 30 and the boundary region 32, the CID value obtained for the downlink CID parameter and the CID value obtained for the uplink CID parameter are both CID values (or a single CID value) associated with the macro node 22.

Note that the downlink and uplink configuration groups 34 and 36 are exemplary. The downlink and uplink parameters mapped to the downlink and uplink configuration groups 34 and 36 may vary depending on the particular implementation or network type of the heterogeneous cellular communication network 20. Further, the configuration groups are not limited to the uplink and downlink configuration groups 34 and 36. Additional or alternative configuration groups may be defined. For example, in another exemplary embodiment, the downlink parameters may be divided into two separate configuration groups, namely, a cell-specific configuration group and a UE-specific configuration group. The cell-specific configuration group includes downlink parameters for PSS/SSS and all functionality that makes use of CRS including the CRS based PDCCH and PDSCH. The UE-specific configuration group includes parameters for DM-RS, DM-RS based PDSCH and Channel-State Information (CSI) Reference Signal (CSI-RS). The CID value for CID parameters for the cell-specific configuration group may be the physical-layer cell ID of the cell 28. A separate CID value is obtained for the CID parameter for the UE-specific configuration group.

Splitting the downlink parameters into two groups as described in the example above can also provide benefits in terms of network power consumption. Broadcast of system information uses CRS-based reception of PBCH, PDCCH, and PDSCH and is thus associated to the cell-specific downlink configuration group while unicast data to a specific terminal typically uses DM-RS-based reception of the PDSCH and are hence associated with the UE-specific downlink configuration group. This allows system information to be broadcast across multiple sites using Multimedia Broadcast over a Single Frequency Network (MBSFN) transmission assuming the same physical-layer cell ID is used in all of these sites with the associated reference signal structures, etc. In addition, this allows unicast information related to a certain UE to be delivered by a single site only. Sites not used for unicast transmission to any UE at a specific point in time may be turned off, which allows for a reduction in network power consumption without having to reassign the UE to another cell using a handover mechanism.

By using configuration groups such as those of FIG. 11, a significant reduction in signaling compared to individual configuration of each parameter is possible. Instead of reconfiguring each parameter in a configuration group individually, a single CID value is signaled to or otherwise obtained by the UE 26. Thus, in essence, for LTE, the present disclosure replaces the physical-layer cell ID as it is related to configuration of uplink and downlink parameters with multiple CID values, which enables independent configuration of the parameters in the different configuration groups. This can be seen as having different "cells" for different types of transmissions.

Figure 12:
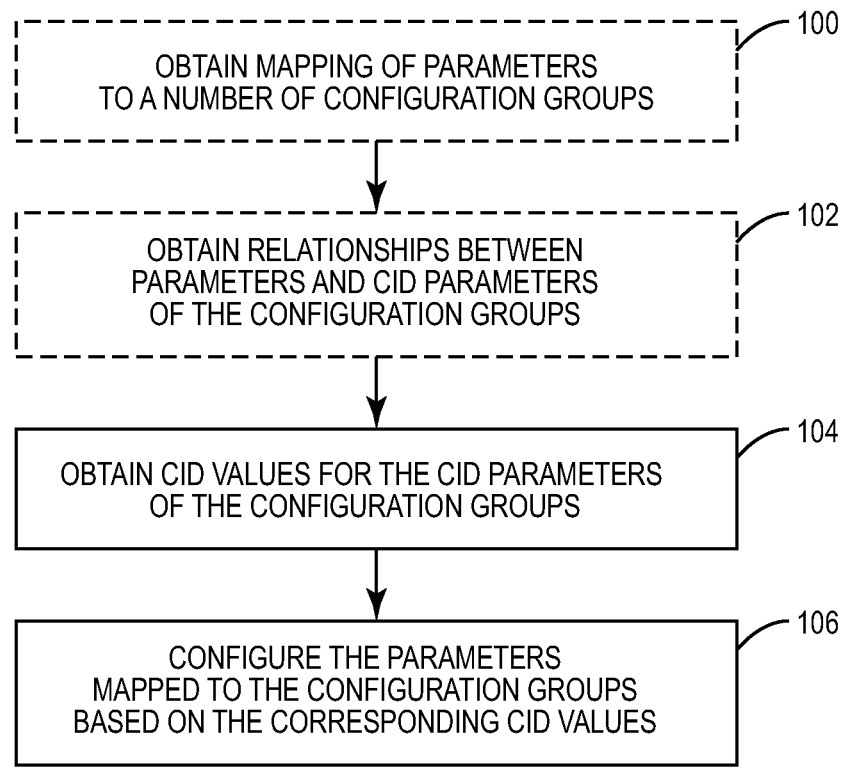
FIG. 12 illustrates the operation of a user equipment device according to one embodiment of the present disclosure.

FIG. 12 illustrates the operation of the UE 26 according to one embodiment of the present disclosure. Optionally, in some embodiments, the UE 26 obtains a mapping of parameters to a number of configuration groups (step 100). The mapping may be received from the heterogeneous cellular communication network 20 via signaling from the heterogeneous cellular communication network 20 (e.g., from the macro node 22). Note that the UE 26 may initially store a default mapping of parameters to configuration groups. The default mapping may then be overridden as needed via signaling from the heterogeneous cellular communication network 20. The signaling may change the number of configuration groups and/or the parameters mapped to the configuration groups. Rather than obtaining the mapping of the parameters to the configuration groups, the mapping of the parameters to the configuration groups may alternatively be stored by the UE 26 or hard-coded into hardware and/or software of the UE 26. For instance, the configuration groups and the parameters mapped, or assigned, to the configuration group may be statically defined by a specification (e.g., the LTE specification) and therefore stored by or hard-coded in the UE 26.

In addition, optionally in some embodiments, the UE 26 obtains relationships between the parameters in the configuration groups and the CID parameters of the configuration groups (step 102). For each parameter, the relationship between the parameter and the CID parameter of the corresponding configuration group may be defined by, for example, a table, mathematical formula, or the like. The relationships may be received from the heterogeneous cellular communication network 20 via signaling from cellular communication network 20 (e.g., from the macro node 22). Note that the UE 26 may initially store default relationships. The default relationships may then be overridden as needed via signaling from the heterogeneous cellular communication network 20. Rather than obtaining the relationships between the parameters and the CID parameters of the corresponding configuration groups, the relationships may alternatively be stored by the UE 26 or hard-coded into hardware and/or software of the UE 26. For instance, the relationships between the parameters in the configuration groups and the corresponding CID parameters may be statically defined by a specification (e.g., the LTE specification) and therefore stored by or hard-coded in the UE 26.

Next, the UE 26 obtains CID values for the CID parameters of the configuration groups (step 104). In one embodiment, the CID values are unicast from the network to the UE 26. As an example, the CID values may be unicast from the macro node 22 to the UE 26. In another embodiment, the CID values are broadcast or multicast to a number of UEs including the UE 26. For example, in LTE, a new reconfiguration Radio Network Temporary Identifier (RNTI) may be defined where multiple UEs including the UE 26 shared the same reconfiguration RNTI. Upon detecting the reconfiguration RNTI on a PDCCH, the UE 26 changes the CID value for the CID parameter of the corresponding configuration group accordingly.

In one particular embodiment, initially, the CID values for the CID parameters for some or all of the configuration groups may be set to a physical-layer cell ID of the cell 28 as a default. The heterogeneous cellular network 20 may then signal new CID values for the CID parameters to the UE 26 via unicast or broadcast/multicast signaling as needed. This signaling may be from, for example, the macro node 22. Thus, in the embodiment where the configuration groups include a downlink configuration group and an uplink configuration group (e.g., the downlink and uplink configuration groups 34 and 36), the downlink and uplink configuration groups may both be configured based on CID values set equal to or otherwise derived from the physical-layer cell ID of the cell 28 unless other CID values are explicitly signaled by the heterogeneous cellular communication network 20 (e.g., signaled via RRC signaling).

When the UE 26 receives the CID values via signaling from the heterogeneous cellular communication network 20, the actual CID values or some indicator for the CID values may be received via the signaling. For example, in one embodiment, the heterogeneous cellular communication network 20 may signal multiple sets of CID values to the UE 26. Using FIG. 10 as an example, the heterogeneous cellular communication network 20 may signal a first set of CID values for the pico region 30, a second set of CID values for the boundary region 32, and a third set of CID values for at least a portion of the cell 28 that is outside of the pico region 30 and the boundary region 32. Thereafter, the heterogeneous cellular communication network 20 may rapidly change the CID values for the UE 26 by signaling an indicator that corresponds to the desired set of CID values. This indicator may be, for example, one or a few bits in the PDCCH, a Media Access Control (MAC) element, or a reserved codepoint (bit combination) of the control signaling on the PDCCH. One of the sets of CID values (e.g., the third set of CID values for the cell 28) may be used as an initial or default set of CID values. Then, as the UE 26 moves within the cell 28, the macro node 22 may rapidly change the CID values from one set of CID values to another set of CID values by signaling the appropriate indicator to the UE 26 via unicast or broadcast/multicast signaling.

Once the CID values are obtained, the UE 26 configures the parameters mapped to the configuration groups based on the corresponding CID values (step 106). More specifically, for each parameter, a value for the parameter is derived based on the CID value for the CID parameter of the corresponding configuration group and the relationship between the parameter and the CID parameter of the corresponding configuration group. Note that while FIG. 12 illustrates obtaining all of the CID values and then configuring all of the parameters in the configuration groups as sequential steps for clarity and ease of discussion, one of ordinary skill in the art will immediately recognize that the CID values and the configuration of the parameters in the corresponding configuration groups may be performed on a per configuration group basis. Thus, the UE 26 may obtain one CID value or multiple CID values and then configure the parameters in the corresponding configuration group(s).

Figure 13:
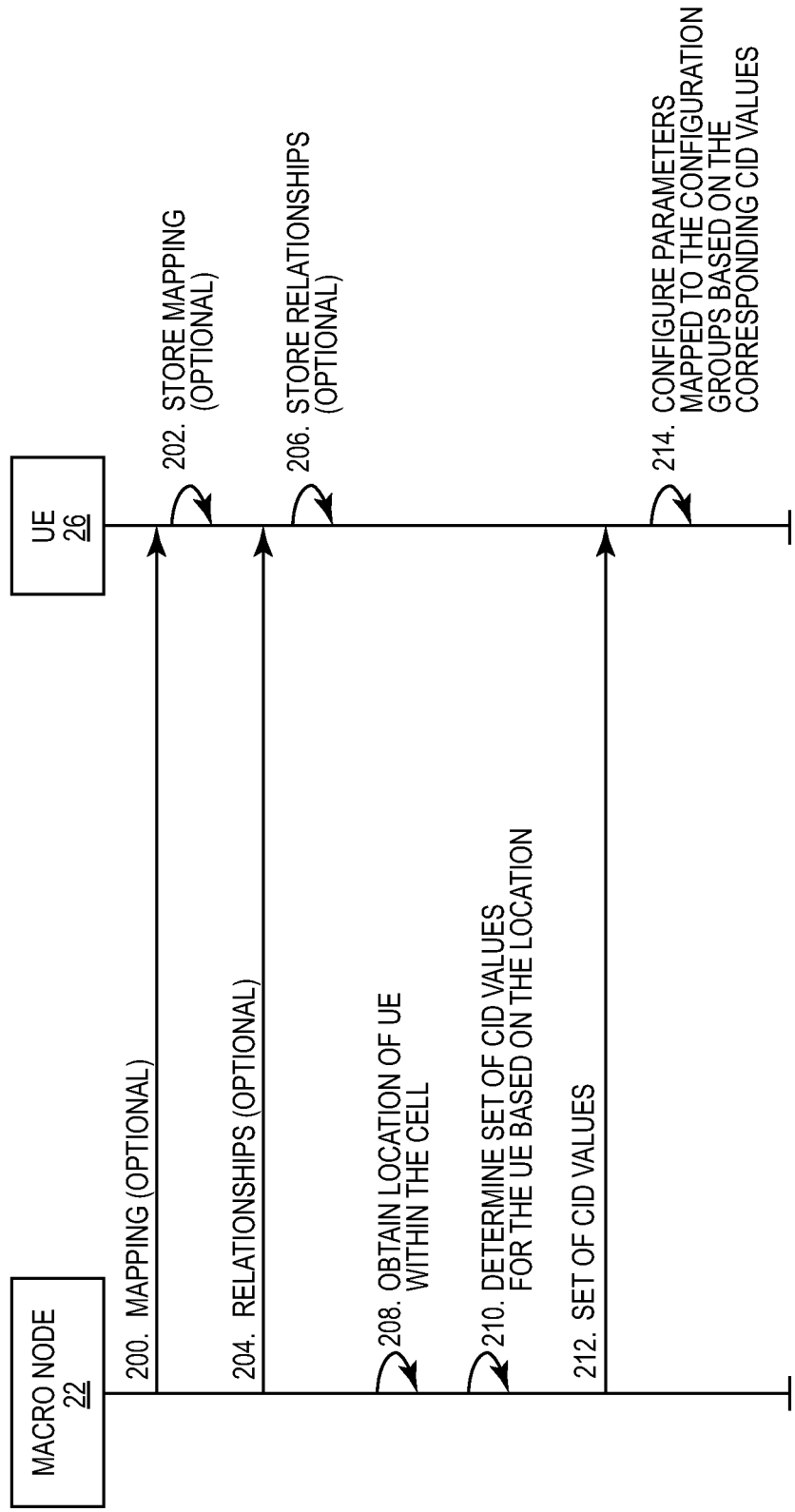
FIG. 13 illustrates the operation of the heterogeneous cellular communication network of FIG. 10 to implement the process of FIG. 12 according to one embodiment of the present disclosure.

FIG. 13 illustrates the operation of the heterogeneous cellular communication network 20 of FIG. 10 to implement the process of FIG. 12 according to one embodiment of the present disclosure. As discussed above, optionally, in some embodiments, the macro node 22 sends a mapping of parameters to configuration groups to the UE 26 (step 200). If so, the UE 26 stores the mapping (step 202). In addition, optionally in some embodiments, the macro node 22 sends relationships between the parameters in the configuration groups and the corresponding CID parameters to the UE 26 (step 204). If so, the UE 26 stores the relationships (step 206). Note that while the macro node 22 sends the mapping of parameters to configuration groups and the relationships between the parameters in the configuration groups to the corresponding CID parameters to the UE 26, the mapping and/or relationships may alternatively be sent to the UE 26 from another network node.

Next, the macro node 22, or some other network node, determines or otherwise obtains a location of the UE 26 within the cell 28 (step 208). As used herein, "location" is a general term and is not limited to any absolute geographic location. As such, while the location of the UE 26 may be an absolute location (e.g., latitude and longitude coordinates), the location of the UE 26 is not limited thereto. The location of the UE 26 may generally be any information that indicates that the UE 26 is located in the pico region 30, the boundary region 32, or a portion of the cell 28 that is outside of the pico region 30 and the boundary region 32. For example, the location of the UE 26 may be represented by radio conditions using various measurements (e.g., pathloss to various network nodes).

The macro node 22 then determines a set of CID values for the UE 26 based on the location of the UE 26 within the cell 28 (step 210). For example, the macro node 22 may store a first set of CID values for the pico region 30, a second set of CID values for the boundary region 32, and a third set of CID values for at least a portion of the cell 28 that is outside of the pico region 30 and the boundary region 32. Then, based on the location of the UE 26, the macro node 22 selects the appropriate set of CID values for the UE 26. The macro node 22 then provides the appropriate set of CID values to the UE 26 (step 212). More specifically, the macro node 22 may signal the actual CID values in the appropriate set of CID values to the UE 26. The UE 26 then configures the parameters mapped to the configuration groups based on the corresponding CID values (step 214). Again, while the macro node 22 determines the set of CID values for the UE 26 and provides the set of CID values to the UE 26, the present disclosure is not limited thereto. The set of CID values for the UE 26 may be determined by and sent to the UE 26 from another network node.

Figure 14:
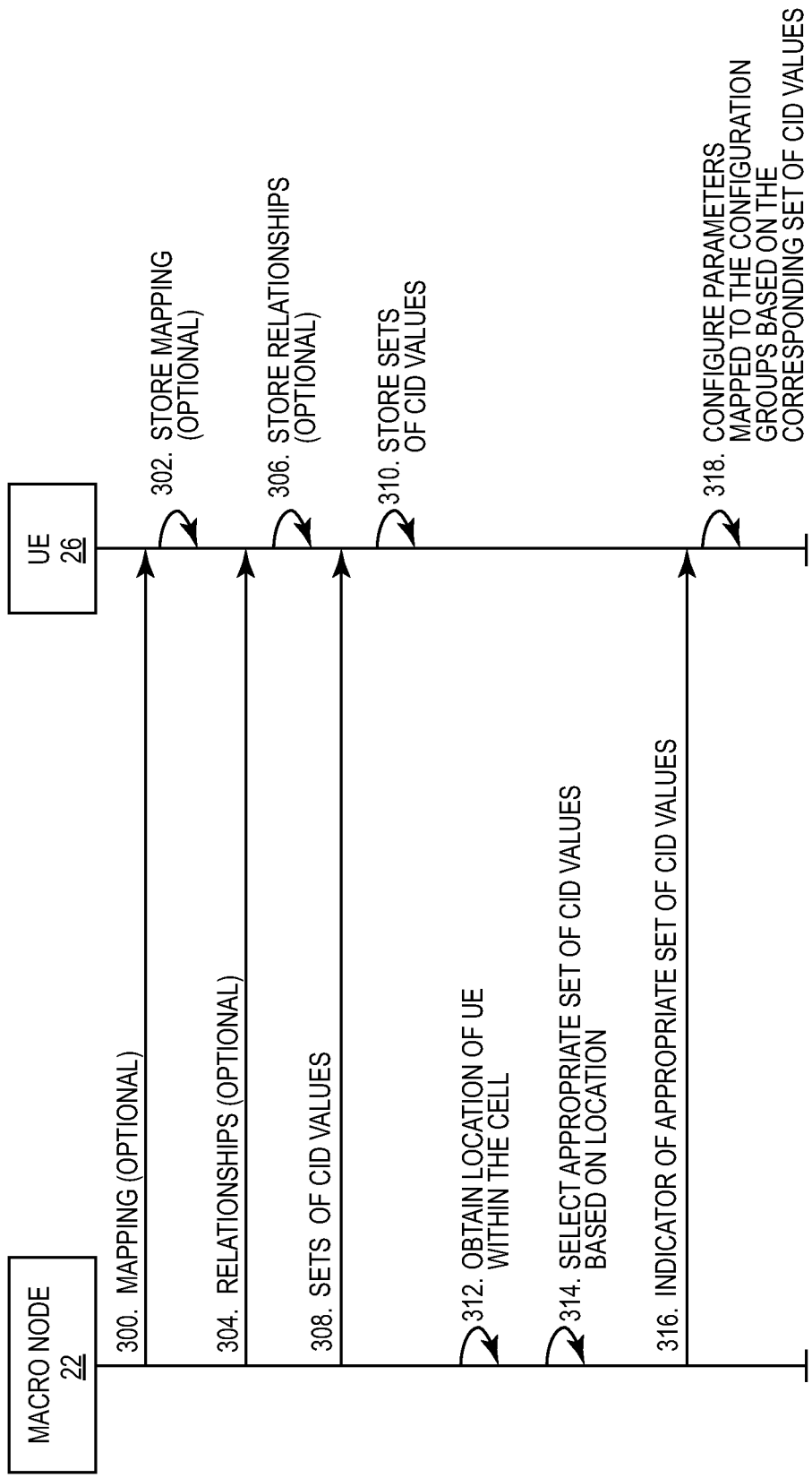
FIG. 14 illustrates the operation of the heterogeneous cellular communication network of FIG. 10 to implement the process of FIG. 12 according to another embodiment of the present disclosure.

FIG. 14 illustrates the operation of the heterogeneous cellular communication network 20 of FIG. 10 to implement the process of FIG. 12 according to another embodiment of the present disclosure. As discussed above, optionally, in some embodiments, the macro node 22 sends a mapping of parameters to configuration groups to the UE 26 (step 300). If so, the UE 26 stores the mapping (step 302). In addition, optionally in some embodiments, the macro node 22 sends relationships between the parameters in the configuration groups and the corresponding CID parameters to the UE 26 (step 304). If so, the UE 26 stores the relationships (step 306). Note that while the macro node 22 sends the mapping of parameters to configuration groups and the relationships between the parameters in the configuration groups to the corresponding CID parameters to the UE 26, the mapping and/or relationships may alternatively be sent to the UE 26 from another network node.

Next, the macro node 22 sends two or more sets of CID values to the UE 26 for the CID parameters of the configuration groups for the UE 26 (step 308). For example, the sets of CID values may include a first set of CID values for the pico region 30, a second set of CID values for the boundary region 32, and a third set of CID values for at least a portion of the cell 28 that is outside of the pico region 30 and the boundary region 32. Again, it should be noted that the two or more sets to CID values may be sent to the UE 26 from a network node other than the macro node 22. The UE 26 stores the sets of CID values (step 310).

The macro node 22 then determines or otherwise obtains a location of the UE 26 within the cell 28 (step 312). As used herein, "location" is a general term and is not limited to any absolute geographic location. As such, while the location of the UE 26 may be an absolute location (e.g., latitude and longitude coordinates), the location of the UE 26 is not limited thereto. The location of the UE 26 may generally be any information that indicates that the UE 26 is located in the pico region 30, the boundary region 32, or a portion of the cell 28 that is outside of the pico region 30 and the boundary region 32. For example, the location of the UE 26 may be represented by radio conditions using various measurements (e.g., pathloss to various network nodes).

The macro node 22 then selects an appropriate set of CID values for the UE 26 based on the location of the UE 26 within the cell 28 (step 314). For example, if the UE 26 is located within the boundary region 32, the macro node 22 selects the set of CID values for the boundary region 32. The macro node 22 then provides an indicator of the appropriate set of CID values to the UE 26 (step 316). More specifically, the macro node 22 may signal the indicator of the appropriate set of CID values, rather than the actual CID values, to the UE 26. The UE 26 then configures the parameters mapped to the configuration groups based on the corresponding set of CID values (step 318). Note that while the macro node 22 selects the appropriate sent of CID values for the UE 26 and provides the indicator of the appropriate set of CID values to the UE 26 in this embodiment, the present disclosure is not limited thereto.

The appropriate set of CID values selected by and the indicator of the appropriate CID values sent by another network node.

Figure 15:
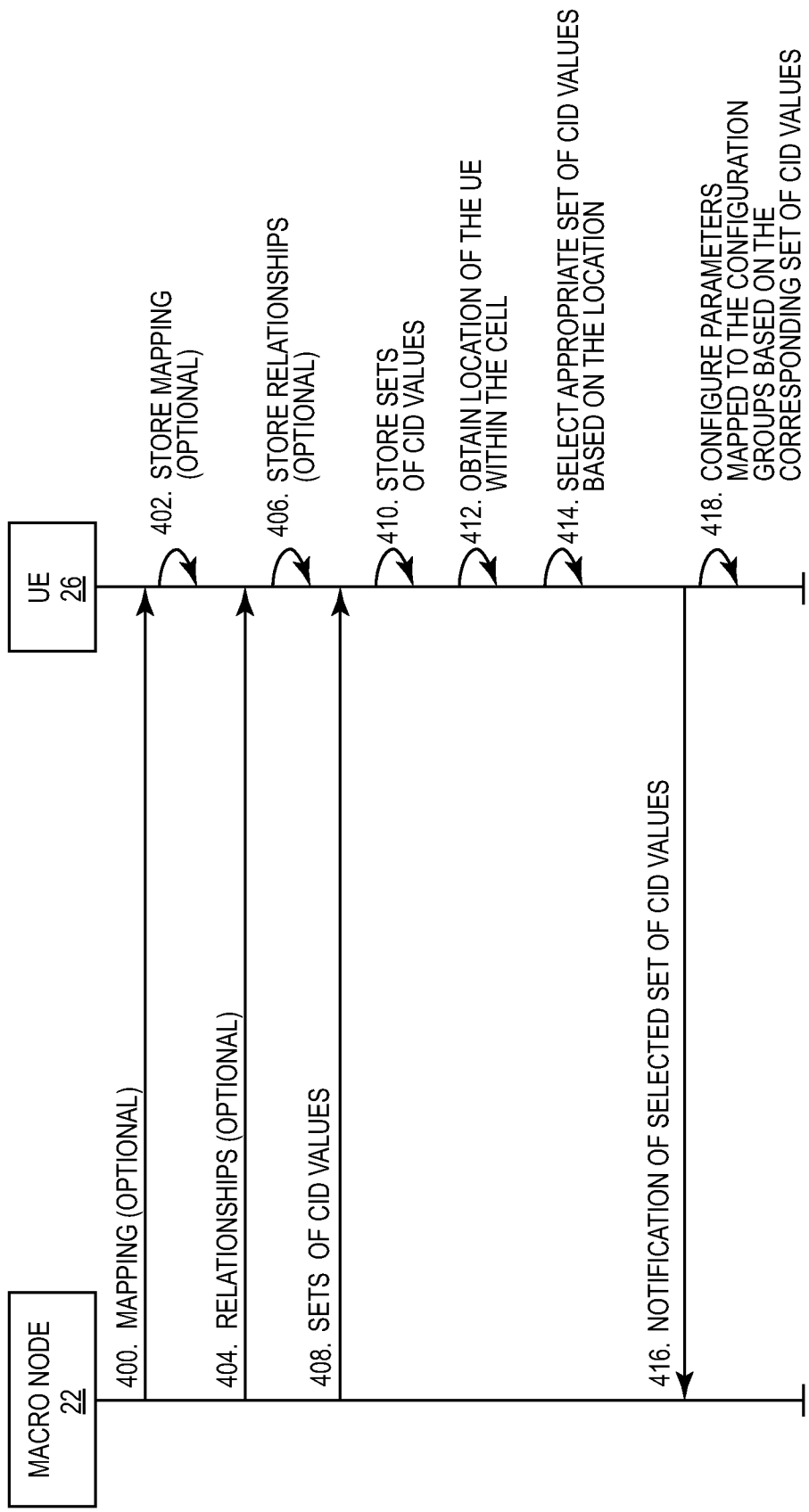
FIG. 15 illustrates the operation of the heterogeneous cellular communication network of FIG. 10 to implement the process of FIG. 12 according to another embodiment of the present disclosure.

FIG. 15 illustrates the operation of the heterogeneous cellular communication network 20 of FIG. 10 to implement the process of FIG. 12 according to another embodiment of the present disclosure. As discussed above, optionally, in some embodiments, the macro node 22 sends a mapping of parameters to configuration groups to the UE 26 (step 400). If so, the UE 26 stores the mapping (step 402). In addition, optionally in some embodiments, the macro node 22 sends relationships between the parameters in the configuration groups and the corresponding CID parameters to the UE 26 (step 404). If so, the UE 26 stores the relationships (step 406). Note that while the macro node 22 sends the mapping of parameters to configuration groups and the relationships between the parameters in the configuration groups to the corresponding CID parameters to the UE 26, the mapping and/or relationships may alternatively be sent to the UE 26 from another network node.

Next, the macro node 22 sends two or more sets of CID values to the UE 26 for the CID parameters of the configuration groups for the UE 26 (step 408). For example, the sets of CID values may include a first set of CID values for the pico region 30, a second set of CID values for the boundary region 32, and a third set of CID values for at least a portion of the cell 28 that is outside of the pico region 30 and the boundary region 32. Again, it should be noted that the two or more sets to CID values may be sent to the UE 26 from a network node other than the macro node 22. The UE 26 stores the sets of CID values (step 310).

In this embodiment, the UE 26 then determines or otherwise obtains a location of the UE 26 within the cell 28 (step 412). As used herein, "location" is a general term and is not limited to any absolute geographic location. As such, while the location of the UE 26 may be an absolute location (e.g., latitude and longitude coordinates), the location of the UE 26 is not limited thereto. The location of the UE 26 may generally be any information that indicates that the UE 26 is located in the pico region 30, the boundary region 32, or a portion of the cell 28 that is outside of the pico region 30 and the boundary region 32. For example, the location of the UE 26 may be represented by radio conditions using various measurements (e.g., pathloss to various network nodes). The UE 26 then selects an appropriate set of CID values for the UE 26 based on the location of the UE 26 within the cell 28 (step 414). For example, if the UE 26 is located within the boundary region 32, the UE 26 selects the set of CID values for the boundary region 32. The UE 26 notifies the macro node 22 of the selected set of CID values (step 416). The UE 26 then configures the parameters mapped to the configuration groups based on the corresponding set of CID values (step 418).

Figure 16:
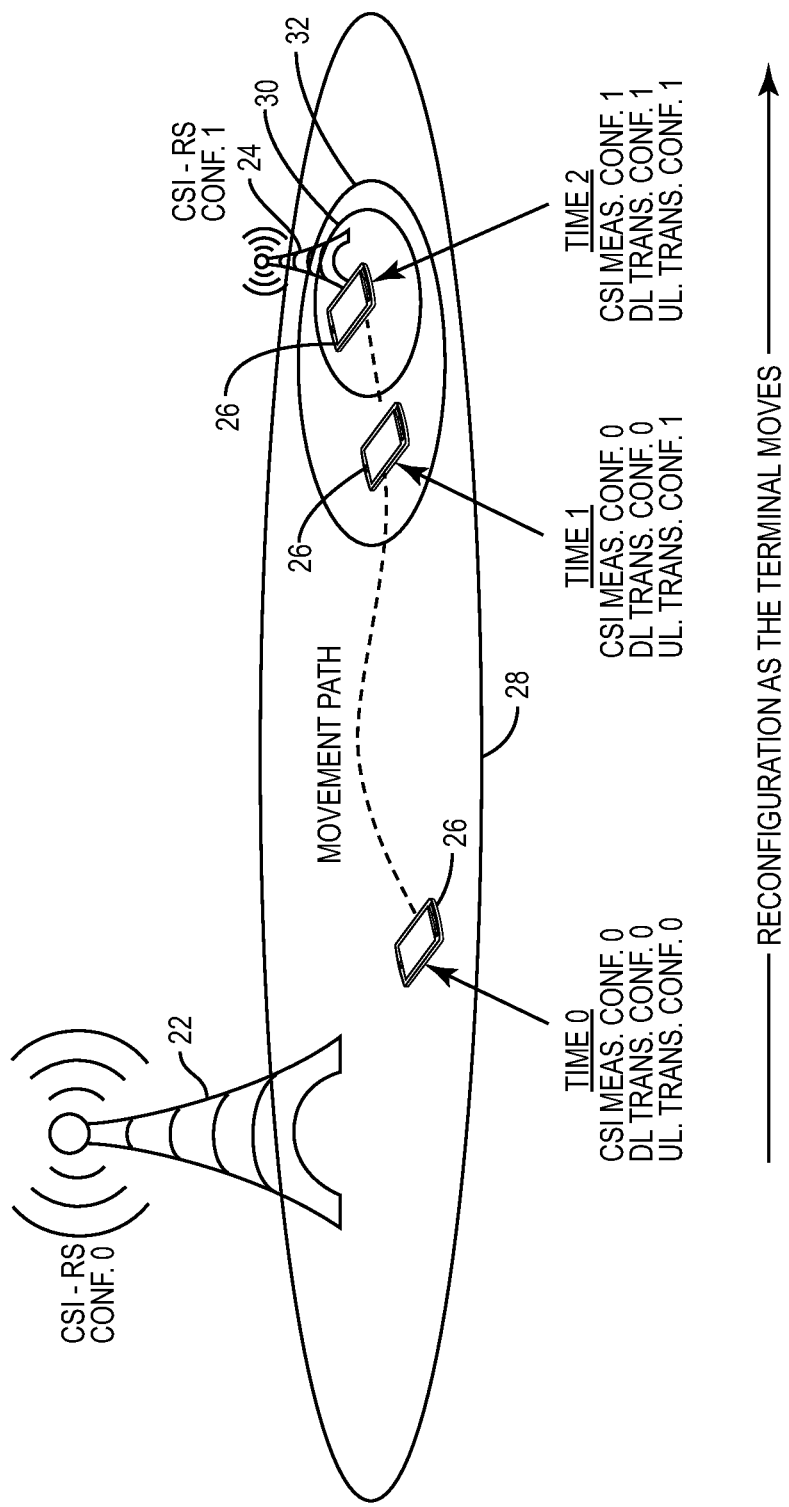
FIG. 16 illustrates one example of configuration groups and a change in Configuration Identity (CID) values for CID parameters of the configuration groups according to one embodiment of the present disclosure.

FIG. 16 illustrates one example of configuration groups and the change in the CID values for the CID parameters of the configuration groups according to one embodiment of the present disclosure. As illustrated, three configuration groups are defined for the UE 26, namely, a CSI-RS configuration group, a downlink transmission configuration group, and an uplink transmission configuration group. The CSI-RS configuration group includes parameters such as, for example, parameters that define which resource elements to measure upon, sequences to use, and the like. The downlink transmission configuration group includes parameters such as, for example, a downlink scrambling parameter, a CRS location parameter, and the like. The uplink transmission configuration group includes parameters such as, for example, an uplink scrambling parameter, a DM-RS structure parameter, and the like.

As illustrated, at time 0, the UE 26 is located in the cell 28 outside of the pico region 30 and the boundary region 32. As such, the set of CID values for the UE 26 is 0, 0, 0 (i.e., the CID values for all three configuration groups are CID values associated with the macro node 22). At time 1, the UE 26 has moved into the boundary region 32. As such, the set of CID values for the UE 26 is 0, 0, 1 (i.e., the CID values for the CSI-RS configuration group and the downlink transmission configuration group are CID values associated with the macro node 22, and the CID value for the uplink transmission configuration group is a CID value associated with the pico node 24). In this manner, the CID value for the uplink transmission configuration group ensures uplink orthogonality at the pico node 24 with other UEs connected to the pico node 24, and the CID values for the CSI-RS and downlink transmission configuration groups remain as CID values associated with the macro node 22 as the UE 26 still receives downlink transmissions from the macro node 22. Lastly, at time 2, the UE 26 has moved into the pico region 30. As such, the set of CID values for the UE 26 is set to 1, 1, 1 (i.e., the CID values for all three configuration groups are CID values associated with the pico node 24). In this manner, the CID values for all three configuration groups are CID values associated with the pico node 24 since both the downlink and uplink transmissions are handled by the pico node 24.

Figure 17:
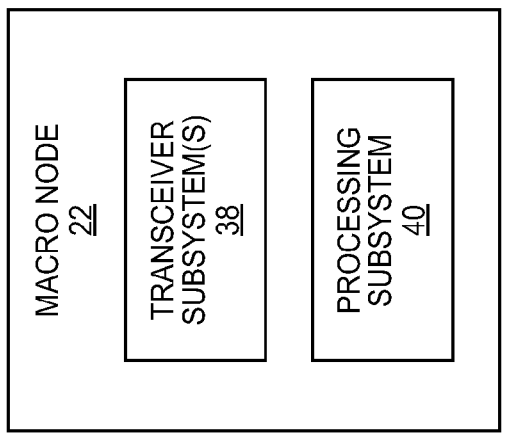
FIG. 17 is a block diagram of a macro node according to one embodiment of the present disclosure.

FIG. 17 is a block diagram of the macro node 22 according to one embodiment of the present disclosure. As illustrated, the macro node 22 includes one or more transceiver subsystems 38 and a processing subsystem 40. One of the one or more transceiver subsystems 38 generally includes analog and, in some embodiments, digital components for sending and receiving data to and from UEs within the cell 28. In addition, the one or more transceiver subsystems 38 may include one or more additional transceiver subsystems 38 for sending data to or receiving data from other macro nodes and/or sending data to and receiving data from other network nodes. In particular embodiments, each of the one or more transceiver subsystems 38 may represent or include radio-frequency (RF) transceivers, or separate RF transmitters and receivers, capable of transmitting suitable information wirelessly to other network components or nodes. From a wireless communications protocol view, the one or more transceiver subsystems 38 implement at least part of Layer 1 (i.e., the Physical or "PHY" Layer).

The processing subsystem 40 generally implements any remaining portion of Layer 1 as well as functions for higher layers in the wireless communications protocol (e.g., Layer 2 (data link layer), Layer 3 (network layer), etc.). In particular embodiments, the processing subsystem 40 may comprise, for example, one or several general-purpose or special-purpose microprocessors or other microcontrollers programmed with suitable software and/or firmware to carry out some or all of the functionality of the macro node 22 described herein. In addition or alternatively, the processing subsystem 40 may comprise various digital hardware blocks (e.g., one or more Application Specific Integrated Circuits (ASICs), one or more off-the-shelf digital and analog hardware components, or a combination thereof) configured to carry out some or all of the functionality of the macro node described herein. Additionally, in particular embodiments, the above described functionality of macro node 22 may be implemented, in whole or in part, by processing subsystem 40 executing software or other instructions stored on a non-transitory computer-readable medium, such as random access memory (RAM), read only memory (ROM), a magnetic storage device, an optical storage device, or any other suitable type of data storage components. Of course, the detailed operation for each of the functional protocol layers, and thus the one or more transceiver subsystems 38 and the processing subsystem 40, will vary depending on both the particular implementation as well as the standard or standards supported by the macro node 22.

Figure 18:
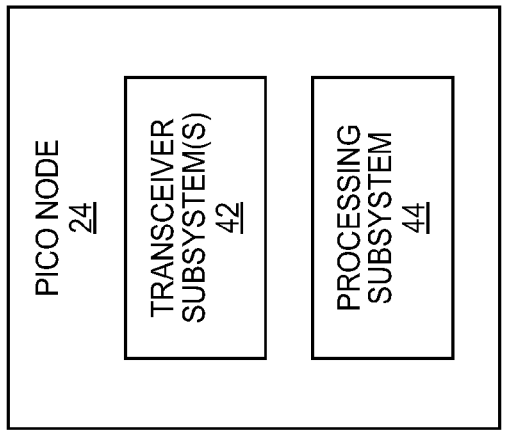
FIG. 18 is a block diagram of a pico node according to one embodiment of the present disclosure.

FIG. 18 is a block diagram of the pico node 24 according to one embodiment of the present disclosure. As illustrated, the pico node 24 includes one or more transceiver subsystems 42 and a processing subsystem 44. One of the one or more transceiver subsystems 42 generally includes analog and, in some embodiments, digital components for sending and receiving data to and from UEs within the pico region 30. In addition, the one or more transceiver subsystems 42 may include one or more additional transceiver subsystems 42 for sending data to or receiving data from the macro node 22 and/or sending data to and receiving data from other network nodes. In particular embodiments, each of the one or more transceiver subsystems 42 may represent or include radio-frequency (RF) transceivers, or separate RF transmitters and receivers, capable of transmitting suitable information wirelessly to other network components or nodes. From a wireless communications protocol view, the one or more transceiver subsystems 42 implement at least part of Layer 1 (i.e., the Physical or "PHY" Layer).

The processing subsystem 44 generally implements any remaining portion of Layer 1 as well as functions for higher layers in the wireless communications protocol (e.g., Layer 2 (data link layer), Layer 3 (network layer), etc.). In particular embodiments, the processing subsystem 44 may comprise, for example, one or several general-purpose or special-purpose microprocessors or other microcontrollers programmed with suitable software and/or firmware to carry out some or all of the functionality of the pico node 24 described herein. In addition or alternatively, the processing subsystem 44 may comprise various digital hardware blocks (e.g., one or more Application Specific Integrated Circuits (ASICs), one or more off-the-shelf digital and analog hardware components, or a combination thereof) configured to carry out some or all of the functionality of the macro node described herein. Additionally, in particular embodiments, the above described functionality of pico node 24 may be implemented, in whole or in part, by processing subsystem 44 executing software or other instructions stored on a non-transitory computer-readable medium, such as random access memory (RAM), read only memory (ROM), a magnetic storage device, an optical storage device, or any other suitable type of data storage components. Of course, the detailed operation for each of the functional protocol layers, and thus the one or more transceiver subsystems 42 and the processing subsystem 44, will vary depending on both the particular implementation as well as the standard or standards supported by the pico node 24.

Figure 19:
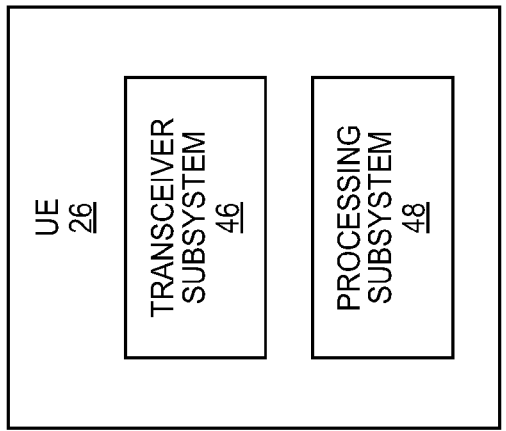
FIG. 19 is a block diagram of a user equipment device (UE) according to one embodiment of the present disclosure.

FIG. 19 is a block diagram of the UE 26 according to one embodiment of the present disclosure. As illustrated, the UE 26 includes a transceiver subsystem 46 and a processing subsystem 48. The transceiver subsystem 46 generally includes analog and, in some embodiments, digital components for sending and receiving data to and from the macro node 22 and the pico node 24. In particular embodiments, each of the one or more transceiver subsystems 46 may represent or include radio-frequency (RF) transceivers, or separate RF transmitters and receivers, capable of transmitting suitable information wirelessly to other network components or nodes. From a wireless communications protocol view, the transceiver subsystem 46 implements at least part of Layer 1 (i.e., the Physical or "PHY" Layer).

The processing subsystem 48 generally implements any remaining portion of Layer 1 as well as functions for higher layers in the wireless communications protocol (e.g., Layer 2 (data link layer), Layer 3 (network layer), etc.). In particular embodiments, the processing subsystem 48 may comprise, for example, one or several general-purpose or special-purpose microprocessors or other microcontrollers programmed with suitable software and/or firmware to carry out some or all of the functionality of the UE 26 described herein. In addition or alternatively, the processing subsystem 48 may comprise various digital hardware blocks (e.g., one or more Application Specific Integrated Circuits (ASICs), one or more off-the-shelf digital and analog hardware components, or a combination thereof) configured to carry out some or all of the functionality of the macro node described herein. Additionally, in particular embodiments, the above described functionality of UE 26 may be implemented, in whole or in part, by processing subsystem 48 executing software or other instructions stored on a non-transitory computer-readable medium, such as random access memory (RAM), read only memory (ROM), a magnetic storage device, an optical storage device, or any other suitable type of data storage components. Of course, the detailed operation for each of the functional protocol layers, and thus the transceiver subsystem 46 and the processing subsystem 48, will vary depending on both the particular implementation as well as the standard or standards supported by the UE 26.

While this disclosure is in the framework of LTE, a person skilled in the art will immediately recognize that the principles can be applied to other standards as well. Further, the concepts described herein provide a number of advantages. For example, the concepts described herein make it possible to decouple the configuration of various parameters, or functionality, of the UE from the system information while maintaining low signaling overhead for configuration messages. Such decoupling provides flexibility needed in non-traditional deployment types such as heterogeneous deployments or distributed antenna systems where it may be beneficial to transmit the system information in a different manner than unicast data and CSI-RS. Also, dividing parameters, or functionality, into different configuration groups where the configuration of the parameters in each configuration group is at least partially based on a corresponding CID value provides further decoupling opportunities. Decoupling of configuration for downlink and uplink is a primary example particularly useful in a heterogeneous deployment where the service area of a node might need to be different in downlink and uplink.

The following acronyms are used throughout this disclosure.

ARQ Automatic Repeat Request
 ASIC Application Specific Integrated Circuit
 BCCH Broadcast Control Channel
 BCH Broadcast Channel
 CCCH Common Control Channel
 CDMA Code Division Multiple Access
 CDMA2000 A family of mobile technology standards which use CDMA channel access to send voice, data, and signaling between mobile phones and cell sites
 CID Configuration Identity
 CRS Cell-Specific Reference Signal
 CSI Channel-State Information
 CSI-RS CSI Reference Signal
 DCCH Dedicated Control Channel
 DCI Downlink Control Information DFT Discrete Fourier Transform
DL-SCH Downlink Shared Channel
DM-RS Demodulation Reference Signal
DTCH Dedicated Traffic Channel
FDD Frequency Division Duplexing
HSPA High Speed Packet Access
ID Identity
LTE Long Term Evolution
$m^2$ Squared Meters
MAC Media Access Control
Mbit/s Megabits Per Second
MBMS Multicast Broadcast Multimedia Services
MBSFN Multimedia Broadcast Over A Single Frequency Network
MCCH Multicast Control Channel
MCH Multicast Channel
ms Milliseconds
MTCH Multicast Traffic Channel
OFDM Orthogonal Frequency Division Multiplexing
PBCH Physical Broadcast Channel
PCCH Paging Control Channel
PCFICH Physical Control Format Indicator Channel
PCH Paging Channel
PDCCH Physical Downlink Control Channel
PDSCH Physical Downlink Shared Channel
PHICH Physical Hybrid-ARQ Indicator Channel
PMCH Physical Multicast Channel
PRACH Physical Random Access Channel
PRS Positioning Reference Signal
PSS Primary Synchronization Signal
PUCCH Physical Uplink Control Channel
PUSCH Physical Uplink Shared Channel
RACH Random Access Channel
RNTI Radio Network Temporary Identifier
RRC Radio Resource Control
RRU Remote Radio Unit
RS Reference Signal
SIR Signal-to-Interference
SRS Sounding Reference Signal
SSS Secondary Synchronization Signal
TDD Time Division Duplexing
TTI Transmission Time Interval
UCI Uplink Control Information
UE User Equipment Device
UL-SCH Uplink Shared Channel
WCDMA Wideband Code Division Multiple Access Those skilled in the art will recognize improvements and modifications to the preferred embodiments of the present disclosure. All such improvements and modifications are considered within the scope of the concepts disclosed herein and the claims that follow.

What is claimed is:

1. A method of operation of a user equipment device in a cellular communication network, comprising:
   obtaining a physical layer cell identifier for a cell;
   receiving an override value from the cellular communication network for at least one of a plurality of configuration identity parameters, the plurality of configuration identity parameters being for a corresponding plurality of configuration groups for the user equipment device in the cellular communication network where each configuration group of the plurality of configuration groups has a corresponding configuration identity parameter and includes one or more parameters for a transmission channel or a reception channel for the user equipment device;
   for each configuration identity parameter of the plurality of configuration identity parameters:
   if an override value has been received for the configuration identity parameter, storing the override value as a configuration identity value for the configuration identity parameter; and
   if no override value has been received for the configuration identity parameter, storing the physical cell layer cell identifier for the cell as the configuration identity value for the configuration identity parameter; and
   for each configuration group of the plurality of configuration groups, configuring values for the one or more parameters for the configuration group based on one of the plurality of configuration identity values obtained for the corresponding configuration identity parameter for the configuration group.

2. The method of claim 1 wherein the cellular communication network comprises a macro node serving a cell in which the user equipment device is located and a pico node that provides a data rate and capacity extension for the cell within a corresponding pico region.

3. The method of claim 2 wherein for each configuration group of the plurality of configuration groups, configuring the values for the one or more parameters for the configuration group comprises configuring the values for the one or more parameters based on the one of the plurality of configuration identity values obtained for the corresponding configuration identity parameter for the configuration group rather than a physical layer cell identifier.

4. The method of claim 2 wherein the plurality of configuration groups comprise a transmission channel configuration group that includes one or more transmission channel parameters and a reception channel configuration group that includes one or more reception channel parameters.

5. The method of claim 4 wherein the one or more transmission channel parameters are one or more uplink parameters comprising at least one of a group consisting of: an uplink frequency hopping parameter, an uplink scrambling parameter, and an uplink user equipment device-specific reference sequence parameter.

6. The method of claim 5 wherein the one or more reception channel parameters are one or more downlink parameters comprising at least one of a group consisting of: one or more downlink scrambling parameters, one or more downlink frequency hopping parameters, a cell specific reference sequence parameter, and a time-frequency mapping parameter for a cell specific reference sequence.

7. The method of claim 2 wherein:
   obtaining the plurality of configuration identity values comprises:
   storing a plurality of sets of configuration identity values, each set of configuration identity values comprising a different plurality of configuration identity values for the configuration identity parameters of the plurality of configuration groups for the user equipment device; and
   receiving an indicator that identifies one of the plurality of sets of configuration identity values; and
   for each configuration group of the plurality of configuration groups, configuring the values for the one or more parameters for the configuration group comprises configuring the values for the one or more parameters for the configuration group based on the one of the plurality of sets of configuration identity values identified by the indicator.

8. The method of claim 2 wherein:
obtaining the plurality of configuration identity values comprises:
  storing a plurality of sets of configuration identity values, each set of configuration identity values comprising a different plurality of configuration identity values for the configuration identity parameters of the plurality of configuration groups for the user equipment device;
  obtaining a location of the user equipment device within the cell; and
  selecting one of the plurality of sets of configuration identity values based on the location of the user equipment device within the cell; and
for each configuration group of the plurality of configuration groups, configuring the values for the one or more parameters for the configuration group comprises configuring the values for the one or more parameters for the configuration group based on the one of the plurality of sets of configuration identity values.

9. The method of claim 2 wherein the plurality of configuration groups for the user equipment device are static.

10. The method of claim 2 wherein the plurality of configuration groups for the user equipment device are dynamic.

11. The method of claim 2 further comprising receiving information that maps parameters to configuration groups for at least a subset of the one or more parameters for each of at least a subset of the plurality of configuration groups.

12. The method of claim 2 further comprising:
receiving information that defines a relationship between one of the configuration identity parameters and one of the one or more parameters in a corresponding one of the plurality of configuration groups; and
wherein, for the one of the plurality of configuration groups, configuring the values for the one or more parameters included in the one of the plurality of configuration groups comprises configuring the values for the one of the one or more parameters based on one of the plurality of configuration identity values obtained for the one of the configuration identity parameters and the information that defines the relationship between the one of the configuration identity parameters and the one of the one or more parameters.

13. The method of claim 2 wherein the plurality of configuration groups comprise an uplink configuration group that includes one or more uplink parameters, a cell-specific downlink configuration group that includes one or more cell-specific downlink parameters, and a user equipment device-specific downlink configuration group that includes one or more user equipment device-specific downlink parameters.

14. The method of claim 2 wherein obtaining the plurality of configuration identity values comprises obtaining the plurality of configuration identity values from the cellular communication network.

15. The method of claim 1 wherein the one or more parameters for the transmission channel or the reception channel for one of the plurality of configuration groups comprises a Demodulation Reference Signal, DM-RS, parameter.

16. A user equipment device enabled to operate in a cellular communication network, comprising:
a transceiver subsystem adapted to provide a transmission channel and a reception channel for the user equipment device in the cellular communication network; and
a processing subsystem associated with the transceiver subsystem that is adapted to:
obtain a physical layer cell identifier for a cell;
receive an override value from the cellular communication network for at least one of a plurality of configuration identity parameters, the plurality of configuration identity parameters being for configuration identity parameters for a corresponding plurality of configuration groups for the user equipment device, where each configuration group of the plurality of configuration groups has a corresponding configuration identity parameter and includes one or more parameters for the transmission channel or the reception channel for the user equipment device;
for each configuration identity parameter of the plurality of configuration identity parameters:
  if an override value has been received for the configuration identity parameter, store the override value as a configuration identity value for the configuration identity parameter; and
  if no override value has been received for the configuration identity parameter, store the physical cell layer cell identifier for the cell as the configuration identity value for the configuration identity parameter; and
for each configuration group of the plurality of configuration groups, configuring values for the one or more parameters for the configuration group based on one of the plurality of configuration identity values obtained for the corresponding configuration identity parameter for the configuration group.

17. The user equipment device of claim 16 wherein for each configuration group of the plurality of configuration groups, the processing subsystem is further adapted to configure the values for the one or more parameters for the configuration group based on the one of the plurality of configuration identity values obtained for the corresponding configuration identity parameter for the configuration group rather than a physical layer cell identifier.

18. The user equipment device of claim 16 wherein the plurality of configuration groups comprise a transmission channel configuration group that includes one or more transmission channel parameters and a reception channel configuration group that includes one or more reception channel parameters.

19. The user equipment device of claim 16 wherein the plurality of configuration groups comprise an uplink configuration group that includes one or more uplink parameters, a cell-specific downlink configuration group that includes one or more cell-specific downlink parameters, and a user equipment device-specific downlink configuration group that includes one or more user equipment device-specific downlink parameters.

20. The user equipment device of claim 16 wherein the one or more parameters for the transmission channel or the reception channel for one of the plurality of configuration groups comprises a Channel State Information Reference Signal, CSI-RS, sequence parameter.

21. The user equipment device of claim 16 wherein the one or more parameters for the transmission channel or the reception channel for one of the plurality of configuration groups comprises a Demodulation Reference Signal, DM-RS, parameter.

* * * * *

UNITED STATES PATENT AND TRADEMARK OFFICE
CERTIFICATE OF CORRECTION

PATENT NO. : 9,125,135 B2
APPLICATION NO. : 13/449604
DATED : September 1, 2015
INVENTOR(S) : Parkvall et al.

It is certified that error appears in the above-identified patent and that said Letters Patent is hereby corrected as shown below:

On the Title Page, in item (74), under "Attorney, Agent, or Firm", in Column 2, Line 1, delete "Teranova," and insert -- Terranova, --, therefor.

In the Specification

In Column 4, Lines 37-42, delete "DM-RSs are used.................... (CSI-RS muting)." and insert the same at line 36, after "when" as a continuation paragraph.

In Column 4, Lines 53, delete "Interference" and insert -- Interference Ratio --, therefor.

In Column 6, Lines 34-35, delete "cells 16 and 18," and insert -- cells 18 and 16, --, therefor.

In Column 6, Line 40, delete "18," and insert -- 18. --, therefor.

In Column 8, Lines 4-5, delete "drawing figures." and insert -- drawings/figures. --, therefor.

In Column 8, Lines 7-8, delete "DRAWING FIGURES" and insert -- DRAWINGS/FIGURES --, therefor.

In Column 8, Line 9, delete "drawing figures" and insert -- drawings/figures --, therefor.

In Column 9, Line 3, delete "drawing figures," and insert -- drawings/figures, --, therefor.

In Column 12, Line 66, delete "groups 34 and 36." and insert -- groups 36 and 34. --, therefor.

In Column 21, Line 38, delete "Interference" and insert -- Interference Ratio --, therefor.

In Column 21, Line 46, delete "Access" and insert -- Access. --, therefor.

Signed and Sealed this
Fifteenth Day of March, 2016

Michelle K. Lee
*Director of the United States Patent and Trademark Office*

Page 1 of 1